(12) United States Patent
Kobayashi et al.

(10) Patent No.: US 10,207,226 B2
(45) Date of Patent: Feb. 19, 2019

(54) CARTRIDGE-TYPE HOLLOW FIBER MEMBRANE MODULE AND METHOD FOR MANUFACTURING CARTRIDGE-TYPE HOLLOW FIBER MEMBRANE MODULE

(71) Applicant: TORAY INDUSTRIES, INC., Tokyo (JP)

(72) Inventors: Atsushi Kobayashi, Otsu (JP); Shun Shimura, Otsu (JP); Mikiko Ikeda, Otsu (JP); Norihiro Takeuchi, Otsu (JP); Shinya Takeuchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 266 days.

(21) Appl. No.: 14/911,503

(22) PCT Filed: Sep. 26, 2014

(86) PCT No.: PCT/JP2014/075637
§ 371 (c)(1),
(2) Date: Feb. 11, 2016

(87) PCT Pub. No.: WO2015/046430
PCT Pub. Date: Apr. 2, 2015

(65) Prior Publication Data
US 2016/0193570 A1    Jul. 7, 2016

(30) Foreign Application Priority Data

Sep. 30, 2013    (JP) .................................. 2013-203120

(51) Int. Cl.
*B01D 63/02* (2006.01)
*B01D 63/04* (2006.01)
*B01D 65/02* (2006.01)

(52) U.S. Cl.
CPC ......... *B01D 63/022* (2013.01); *B01D 63/043* (2013.01); *B01D 65/022* (2013.01);
(Continued)

(58) Field of Classification Search
CPC ........ B01D 61/08; B01D 61/18; B01D 61/28; B01D 63/02; B01D 63/022; B01D 63/04;
(Continued)

(56) References Cited

U.S. PATENT DOCUMENTS

| 2004/0045893 A1* | 3/2004 | Watanabe ............ B01D 63/022 |
| | | 210/321.79 |
| 2006/0113235 A1 | 6/2006 | Strohm et al. |
| 2009/0032455 A1 | 2/2009 | Tada et al. |

FOREIGN PATENT DOCUMENTS

| JP | 64-30605 A | 2/1989 |
| JP | 2004-202478 A | 7/2004 |

(Continued)

OTHER PUBLICATIONS

International Search Report, issued in PCT/JP2014/075637, dated Nov. 11, 2014.
(Continued)

*Primary Examiner* — Pranav N Patel
(74) *Attorney, Agent, or Firm* — Birch, Stewart, Kolasch & Birch LLP

(57) ABSTRACT

A cartridge type hollow fiber membrane module including a housing, a hollow-fiber membrane bundle having a plurality of hollow fiber membranes, a first potting part that bonds the hollow fiber membranes at at least one end of the bundle of the plurality of hollow fiber membranes such that the hollow fiber membranes are open, and a sealing material that fixes the first potting part to the housing liquid-tightly, wherein the first potting part comprises an inner potting part and an outer potting part, wherein the inner potting part and the
(Continued)

outer potting part are both formed of a potting material, wherein the sealing material is in contact with the outer potting part, and wherein both the inner potting part and the outer potting part are formed in a sealing direction of the sealing material.

The cartridge type hollow fiber membrane module is free of leakage and contamination due to separation of a potting material even when steam sterilization is performed.

17 Claims, 14 Drawing Sheets

(52) U.S. Cl.
 CPC ...... *B01D 2313/04* (2013.01); *B01D 2313/44* (2013.01); *B01D 2319/04* (2013.01); *B01D 2321/08* (2013.01)

(58) Field of Classification Search
 CPC .................. B01D 63/043; B01D 63/06; B01D 2201/0415; B01D 2313/20; B01D 2313/44; B01D 2313/04; B01D 2313/21; B01D 2313/23; B01D 69/08; B01D 65/003; C02F 2201/004
 See application file for complete search history.

(56) References Cited

FOREIGN PATENT DOCUMENTS

| | | |
|---|---|---|
| JP | 2009-136875 A | 6/2009 |
| WO | WO 2007/077833 A1 | 7/2007 |

OTHER PUBLICATIONS

Written Opinion of the International Searching Authority, issued in PCT/JP2014/075637, dated Nov. 11, 2014.

* cited by examiner

[Fig. 1]
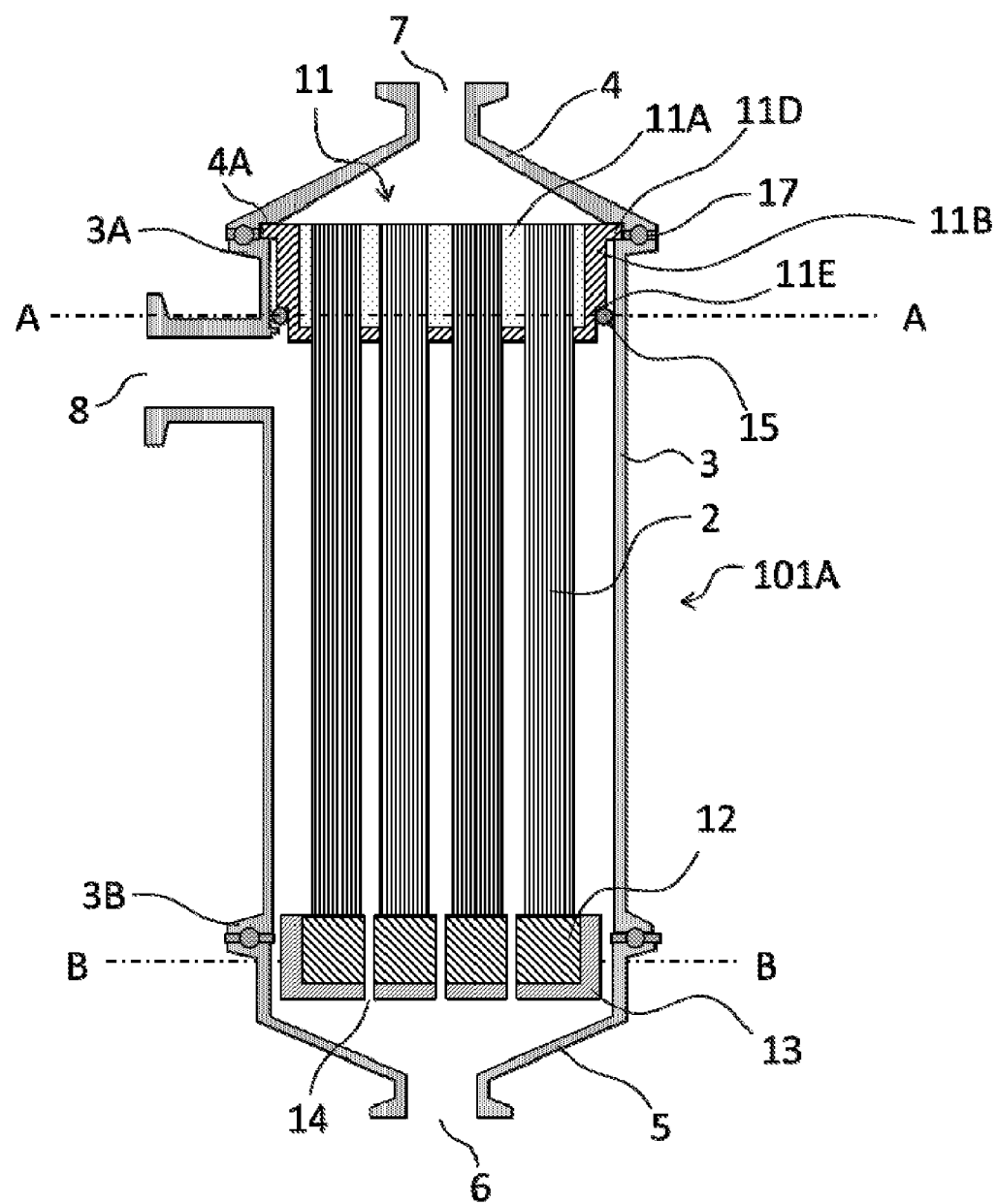

[Fig. 2]
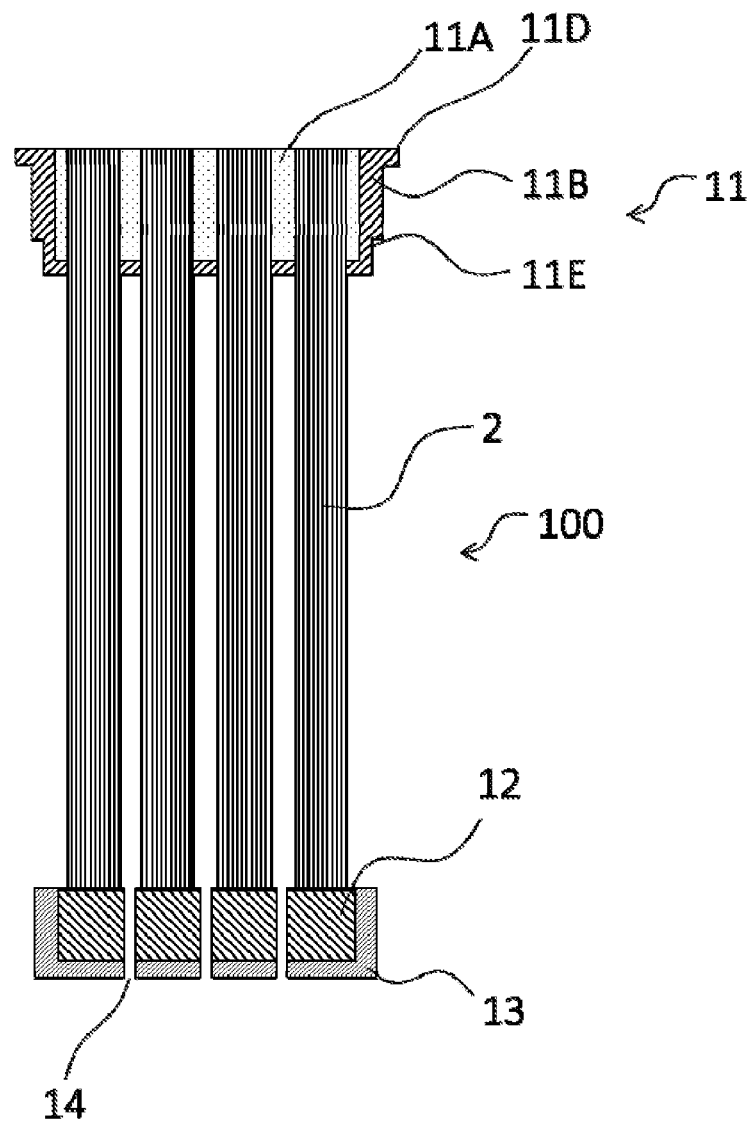

[Fig. 3]
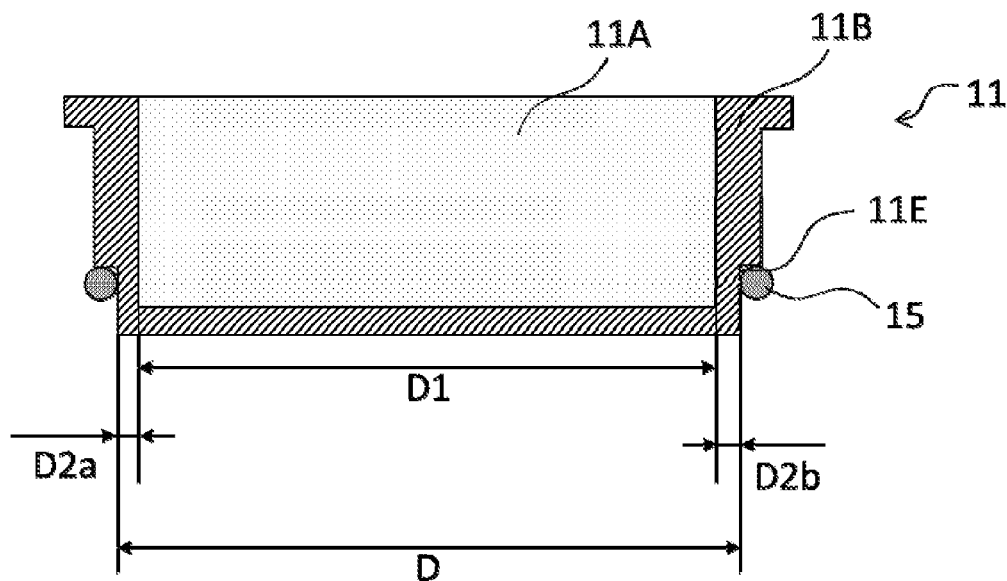
[Fig. 4]
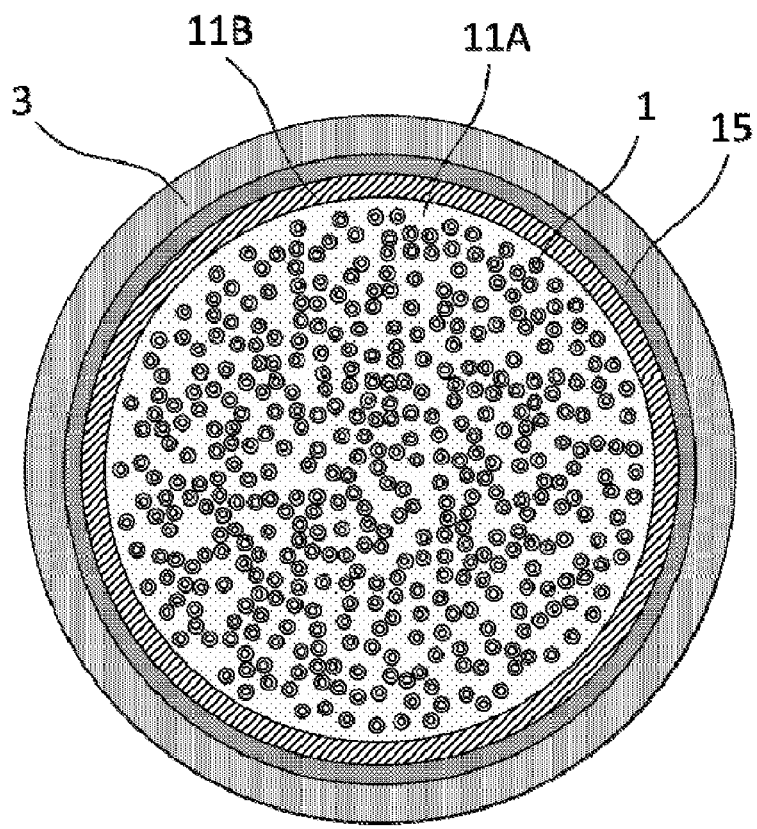

[Fig. 5]
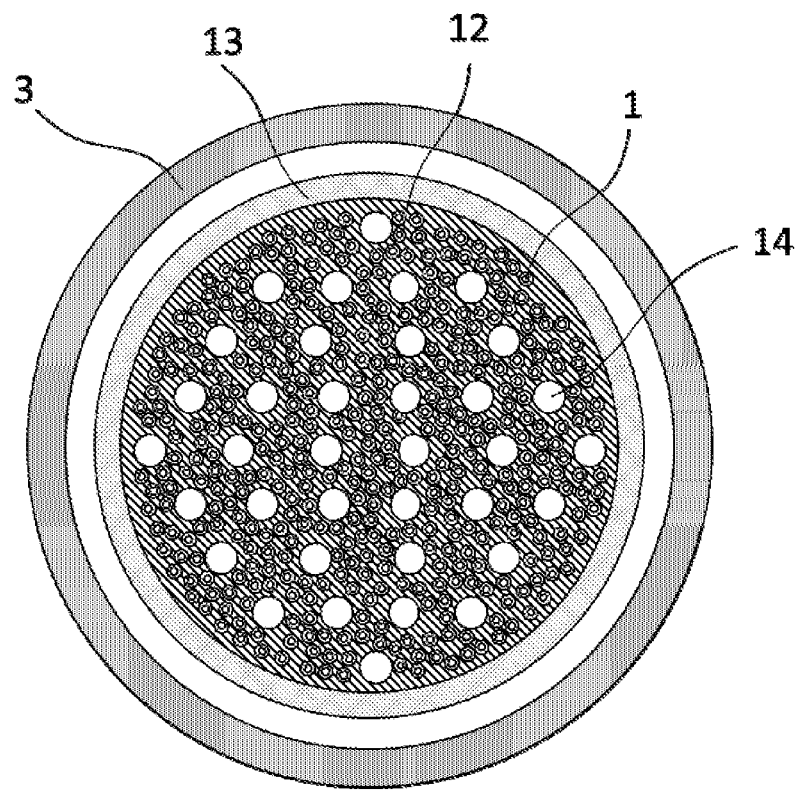

[Fig. 6]
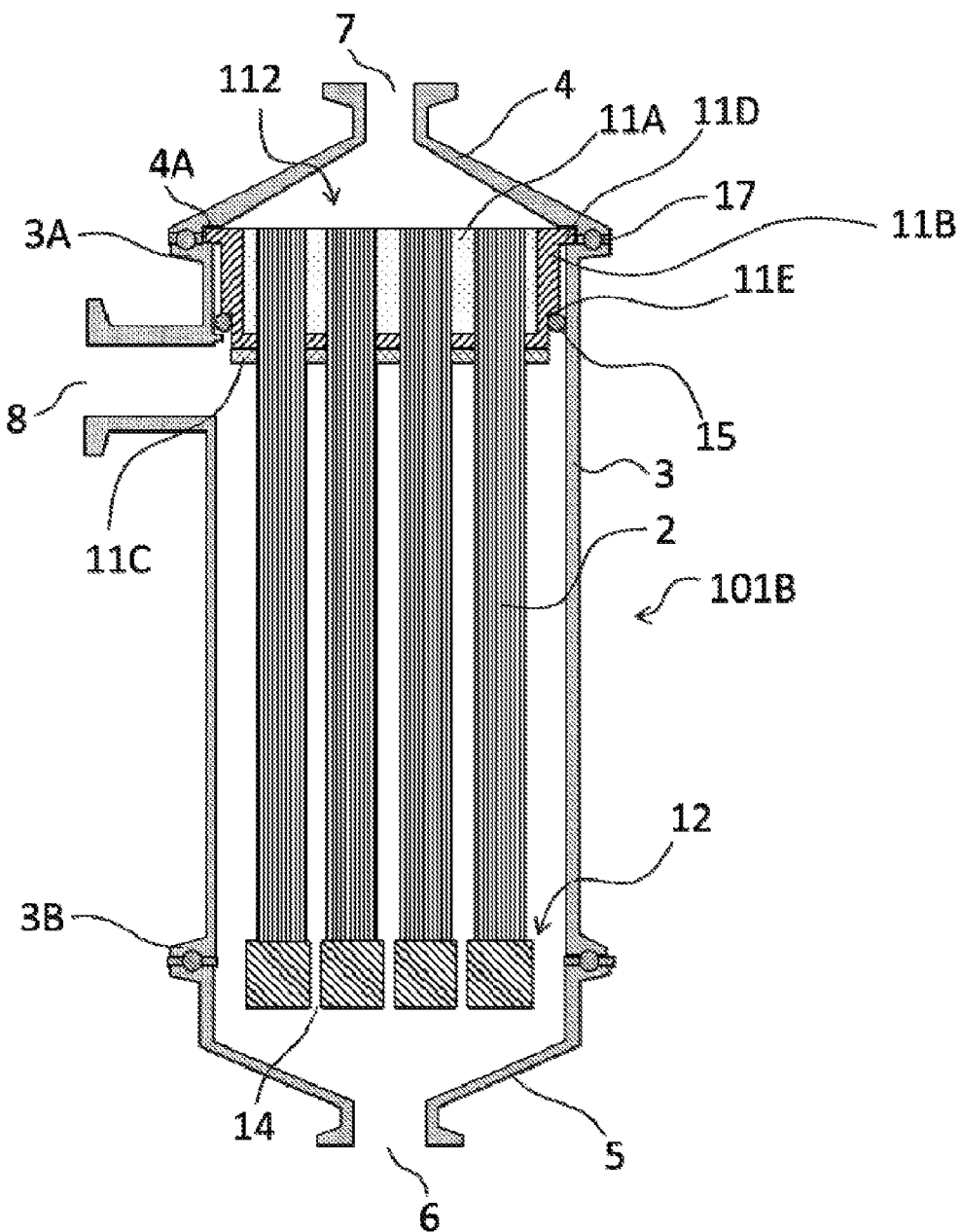

[Fig. 7]
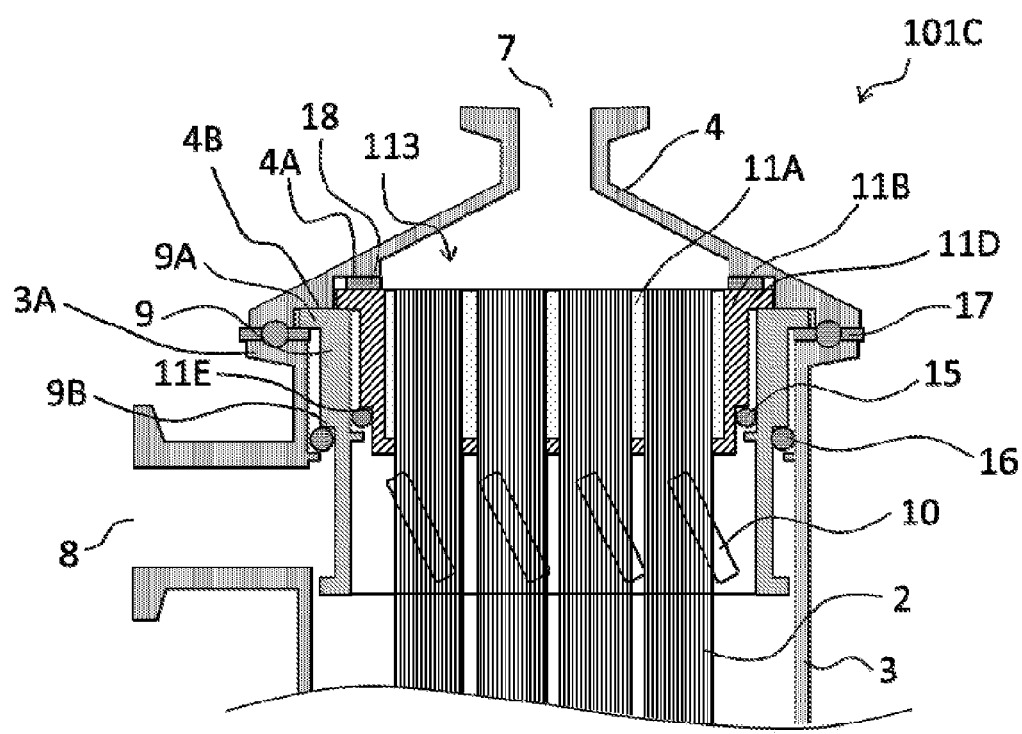

[Fig. 8]
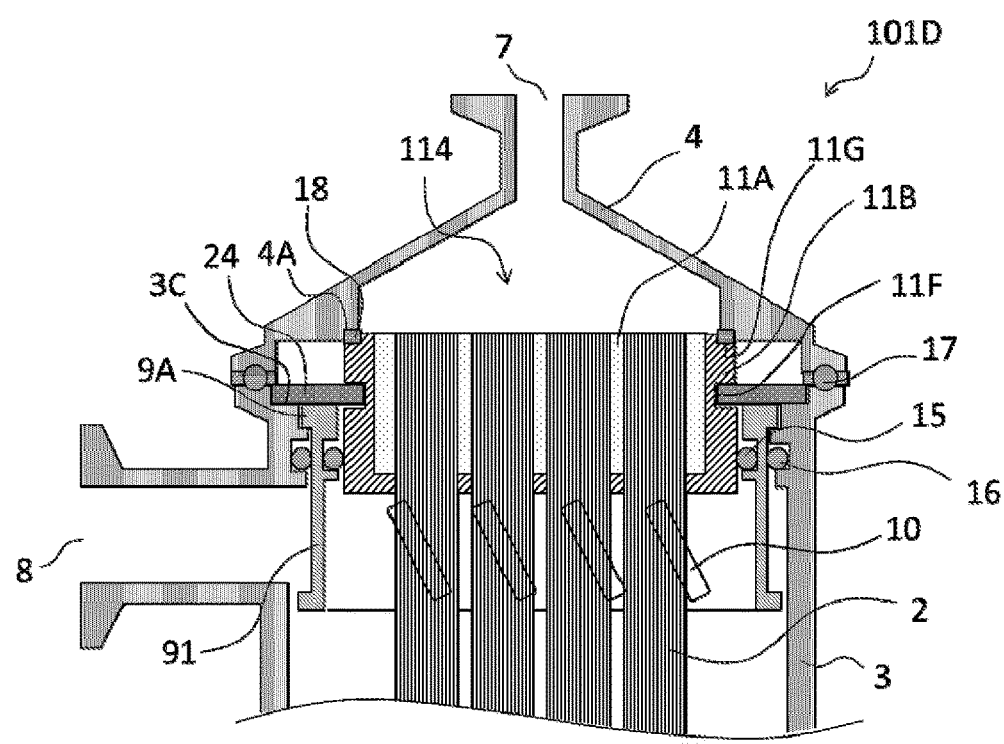

[Fig. 9]
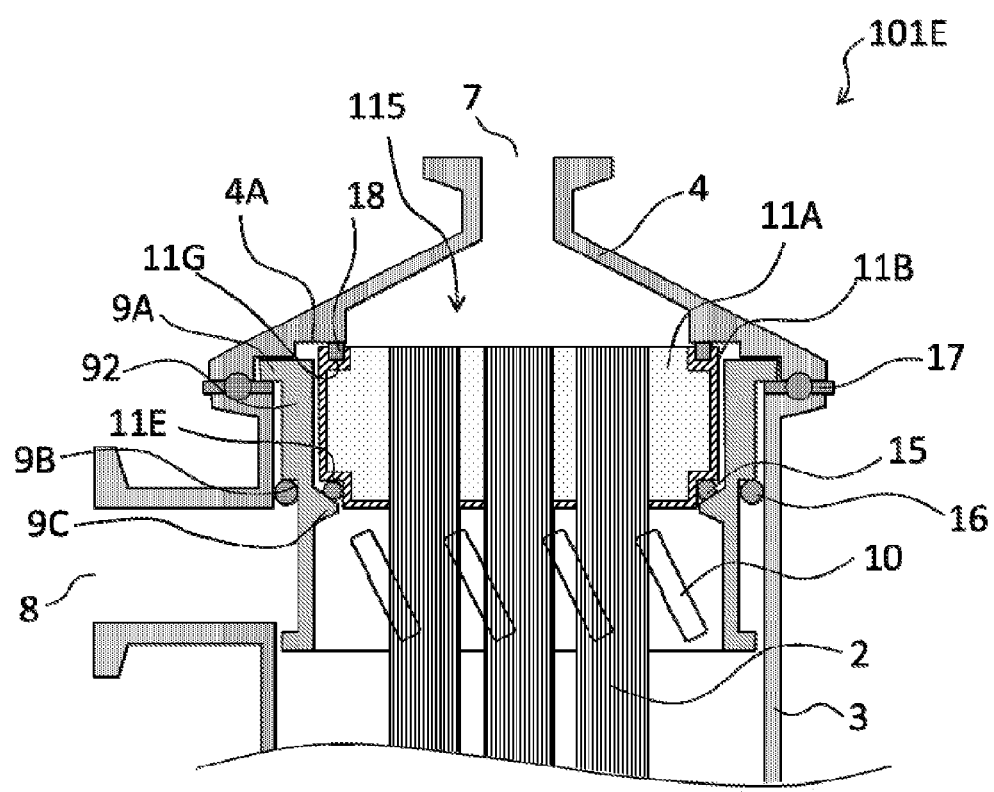

[Fig. 10]
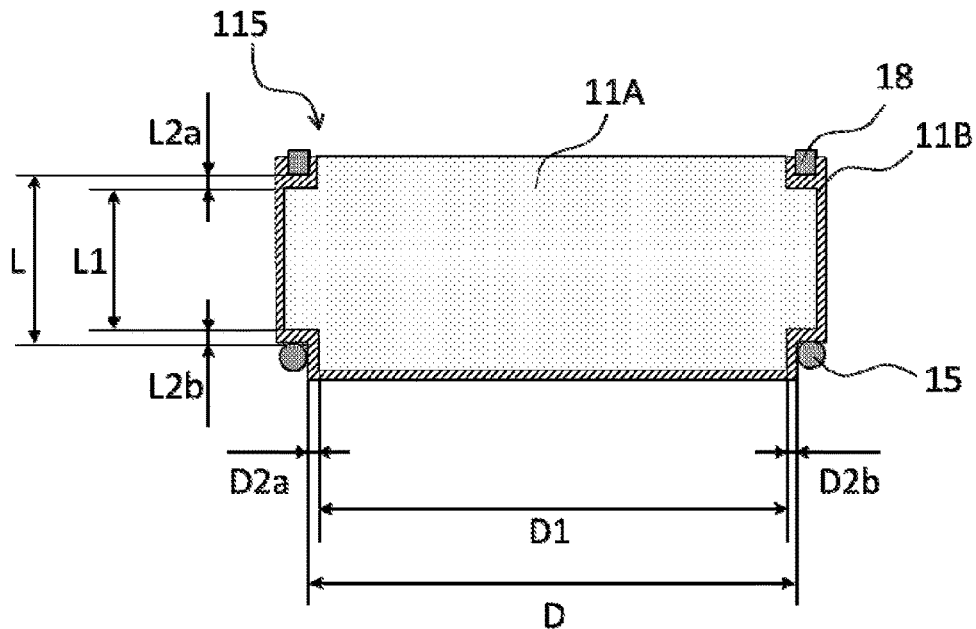
[Fig. 11]
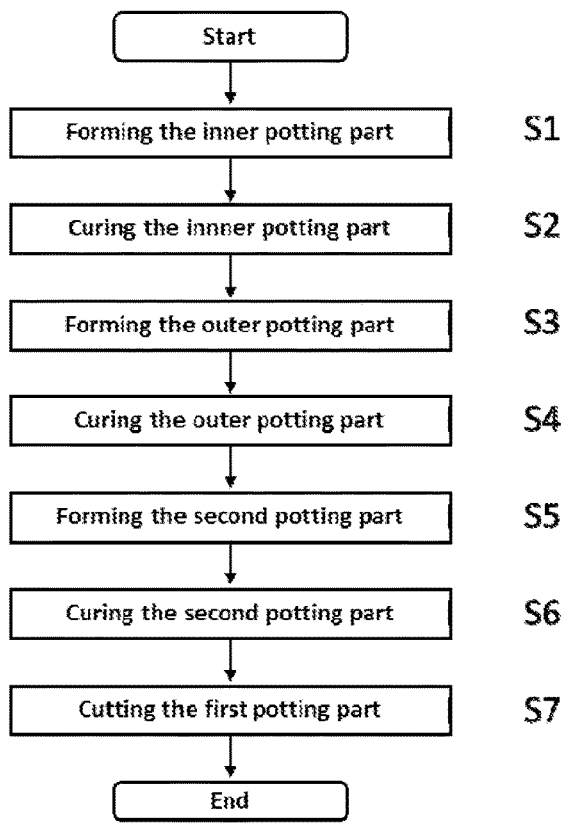

[Fig. 12]
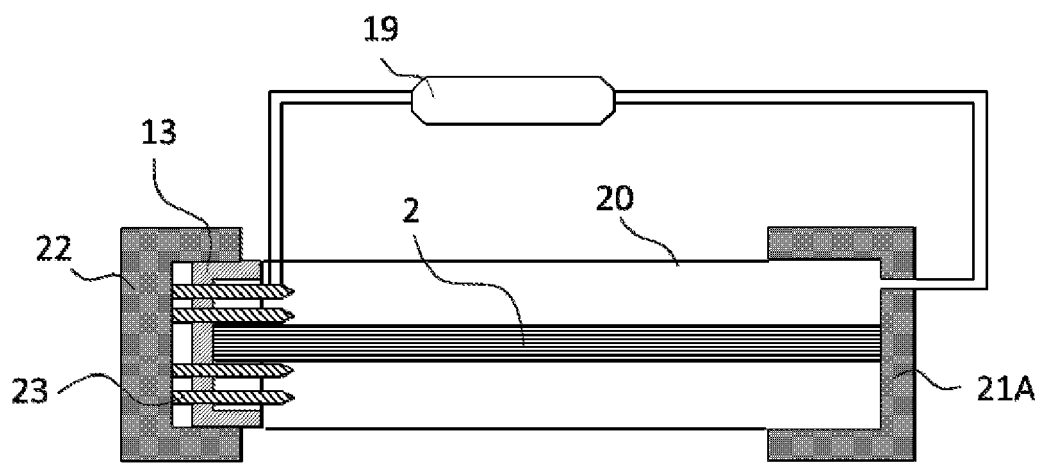
[Fig. 13]
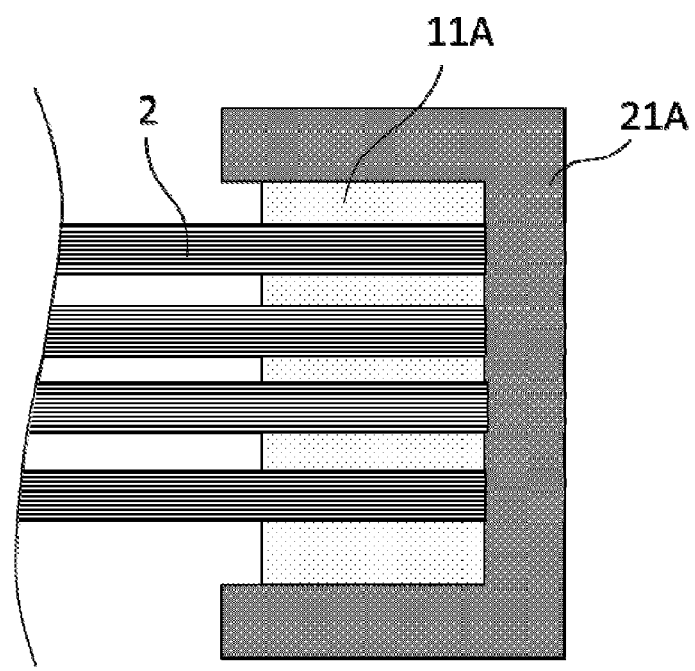

[Fig. 14]
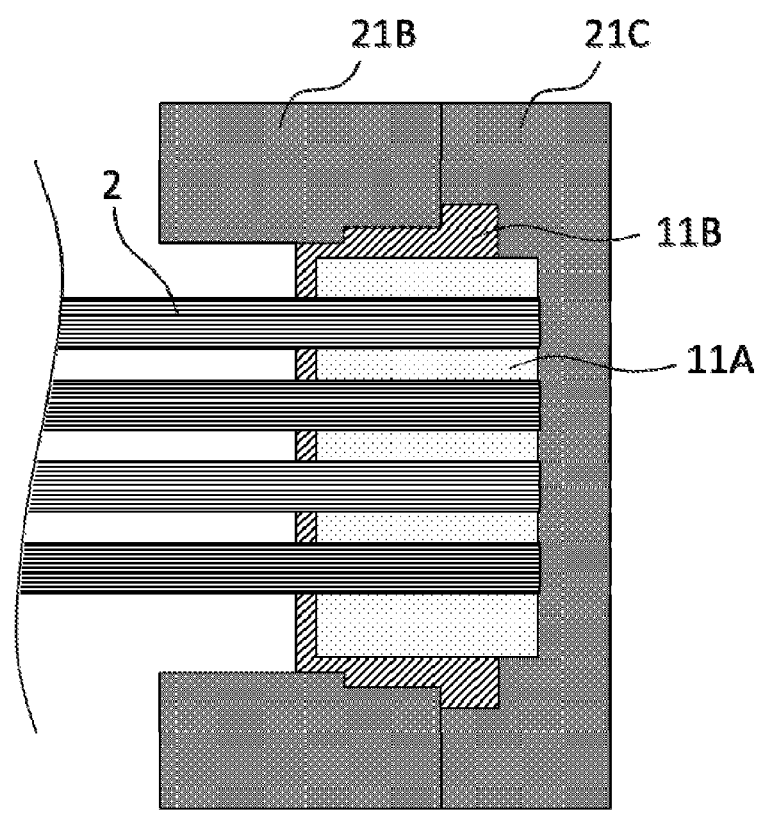

[Fig. 15]
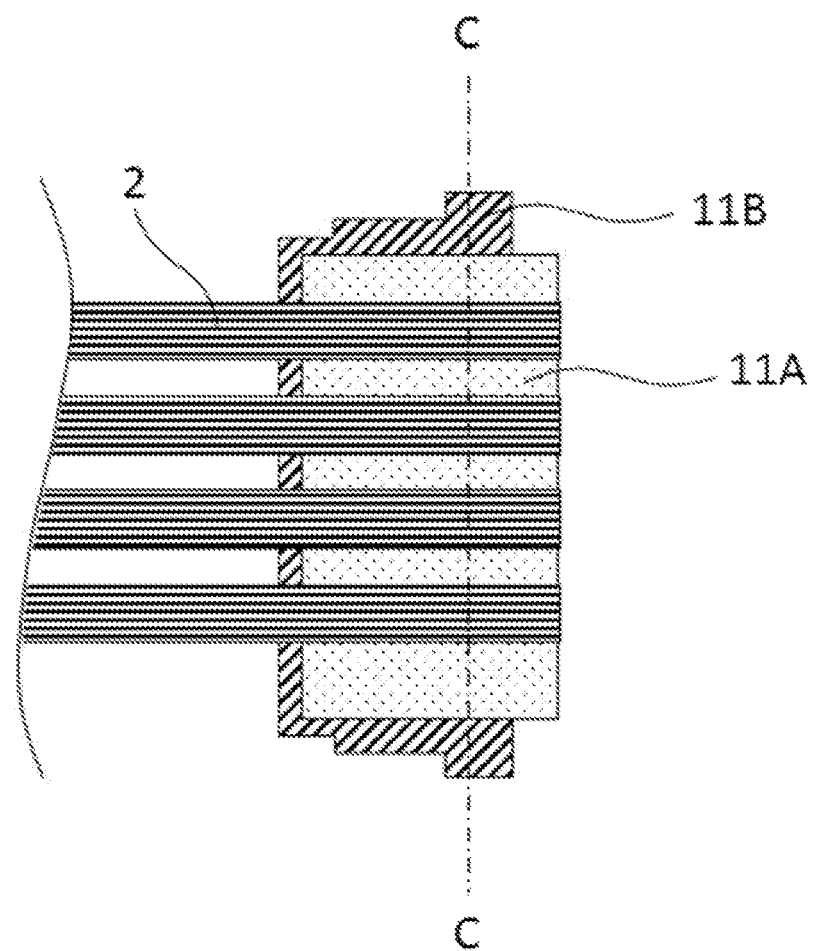

[Fig. 16]
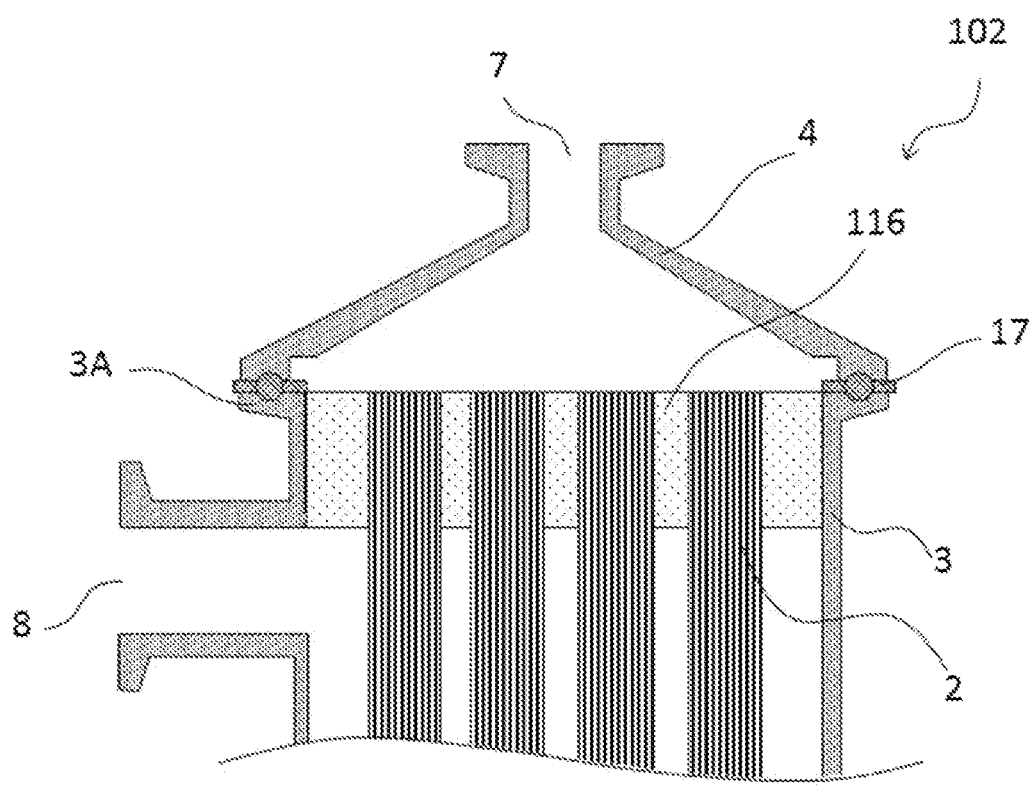

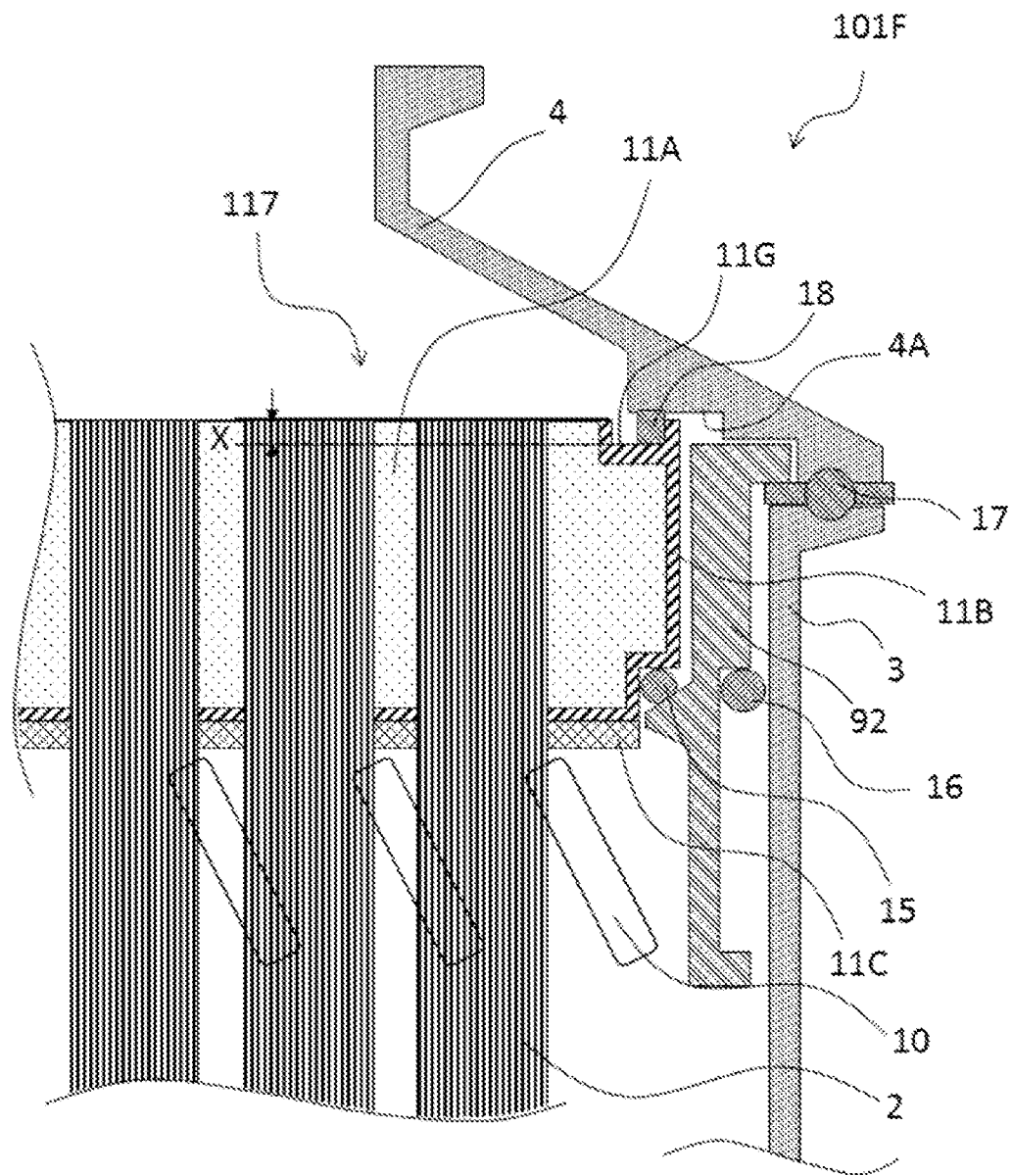
[Fig. 17]

CARTRIDGE-TYPE HOLLOW FIBER MEMBRANE MODULE AND METHOD FOR MANUFACTURING CARTRIDGE-TYPE HOLLOW FIBER MEMBRANE MODULE

TECHNICAL FIELD

The present invention relates to a cartridge type hollow fiber membrane module that is used in the fields such as water treatment, fermentation industry, preparation of pharmaceuticals, and food industry, and a method of manufacturing the cartridge type hollow fiber membrane module.

BACKGROUND ART

Fermentation methods, methods for matter production involving culturing of microorganisms or cultured cells, can be broadly classified into two types: (1) batch fermentation and fed-batch fermentation and (2) continuous fermentation.

In (2) continuous fermentation, methods have been proposed in which microorganisms or cultured cells are filtered through a separation membrane, and the microorganisms or cultured cells in a concentrate are held in or refluxed to a fermentation broth while recovering chemical products from filtrate, whereby the concentration of the microorganisms or cultured cells in the fermentation broth is maintained high.

PRIOR ART DOCUMENTS

Patent Documents

For example, a continuous fermentation technique is disclosed using a continuous fermentation apparatus in which a flat membrane made of an organic polymer is used as a separation membrane (see Patent Document 1).

To solve the problems of Patent Document 1, a continuous fermentation technique is disclosed in which the separation membrane used in a continuous fermentation apparatus is a hollow fiber membrane made of an organic polymer (see Patent Document 2).

Furthermore, as a separation membrane module using a hollow fiber membrane, a module is disclosed in which a bundle of a plurality of hollow fiber membranes are contained in a cylindrical case, and both ends of the hollow-fiber membrane bundle are fixed to the cylindrical case with a potting material with at least one end face of the plurality of hollow fiber membranes open; in addition, a technique of a hollow fiber membrane module for water treatment is disclosed in which, for example, one end of the plurality of hollow fiber membranes is not fixed in the case but sealed individually to significantly improve the dischargeability of suspended matter (see Patent Document 3). Furthermore, as a configuration of a hollow fiber membrane module in which suspended matter can be discharged well and hollow fiber membranes can be easily sealed, a method is disclosed in which the lower end to be sealed of a hollow-fiber membrane bundle is divided into a plurality of small bundles, and each of the small bundles is sealed with a resin (see Patent Document 4).

Patent Document 1: JP 2007-252367 A
Patent Document 2: JP 2008-237101 A
Patent Document 3: JP 07-60074 A
Patent Document 4: JP 2005-230813 A

SUMMARY OF THE INVENTION

Problems to be Solved by the Invention

However, the technique disclosed in Patent Document 1 was an inefficient technique: for example, the cost benefit of producing chemical products of interest using this technique was not sufficient because the effective membrane area of a flat membrane unit relative to its installed volume was small.

In the technique disclosed in Patent Document 2, the membrane area per unit volume of a membrane unit could be large, as a result of which the fermentation production efficiency was dramatically improved compared with conventional continuous fermentation.

In the production of chemical products using continuous fermentation, it is necessary to perform culturing basically without contamination. For example, if a fermentation broth, when filtered, is contaminated through a separation membrane module, fermentation efficiency will decrease, and chemical products cannot be produced efficiently for reasons such as foaming in a fermenter. Thus, to prevent contamination, it is necessary to sterilize the separation membrane module. Examples of common sterilization methods include dry heat sterilization, boiling water sterilization, steam sterilization, ultraviolet sterilization, gamma sterilization, and gas sterilization. Particularly when a large fermenter, a pipe connected to a fermenter, or a separation membrane module is sterilized, steam sterilization (typically at 121° C. for 20 minutes) is most effective.

However, when a sterilization method using heat, such as steam sterilization, is used to sterilize a hollow fiber membrane module, a potting material used in the hollow fiber membrane module may be separated from a housing by a heat load, causing problems such as leakage of a feed to the filtrate side and contamination. The techniques disclosed Patent Document 3 and Patent Document 4 also could not solve this problem.

The present invention has been developed in view of the foregoing and aims to provide a cartridge type hollow fiber membrane module that is free of leakage and contamination due to separation of a potting material even when steam sterilization is performed, and a method of manufacturing the cartridge type hollow fiber membrane module.

Means for Solving the Problems

To solve the above problems, the cartridge type hollow fiber membrane module of the present invention has a structure of either (1) or (2) below:

(1) A cartridge type hollow fiber membrane module including:
   a housing;
   a hollow-fiber membrane bundle having a plurality of hollow fiber membranes;
   a first potting part that bonds the hollow fiber membranes at at least one end of the bundle of the plurality of hollow fiber membranes such that the hollow fiber membranes are open; and
   a sealing material that fixes the first potting part to the housing liquid-tightly,
   wherein the first potting part includes an inner potting part and an outer potting part, wherein the inner potting part and the outer potting part are both formed of a potting material, wherein the sealing material is in contact with the outer potting part, and wherein both the inner potting part and the outer potting part are formed in a sealing direction of the sealing material; or (2) A cartridge type hollow fiber membrane module including:
   a housing;
   a cylindrical case contained in the housing;
   a hollow-fiber membrane bundle having a plurality of hollow fiber membranes;

a first potting part that bonds the hollow fiber membranes at at least one end of the bundle of the plurality of hollow fiber membranes such that the hollow fiber membranes are open; and a sealing material that fixes the first potting part to the cylindrical case liquid-tightly, wherein the first potting part includes an inner potting part and an outer potting part, wherein the inner potting part and the outer potting part are both formed of a potting material, wherein the sealing material is in contact with the outer potting part, and wherein both the inner potting part and the outer potting part are formed in a sealing direction of the sealing material.

A method of manufacturing the cartridge type hollow fiber membrane module of the present invention has the following structure:

A method of manufacturing the cartridge type hollow fiber membrane module according to any one of the above, including the steps of:

(a) forming an inner potting part included in the first potting part; and (b) forming an outer potting part included in the first potting part, the step (a) including:

(a-1) an inner potting material disposing step in which a potting material for forming the inner potting part is filled between the hollow fiber membranes; and (a-2) a curing step in which the potting material in (a-1) is cured, the step (b) including:

(b-1) an outer potting material disposing step in which a potting material for forming the outer potting part is disposed such that after the curing step (a-2), the outer potting part comes into contact with the sealing material and both the inner potting part and the outer potting part are formed in the sealing direction of the sealing material; and (b-2) a curing step in which the potting material in (b-1) is cured and shrunk.

In the cartridge type hollow fiber membrane module of the present invention, the first potting part preferably has a proportion of length P (%) satisfies Expression (1) below, wherein P (%) represents the proportion of the length of the outer potting part in the sealing direction in the length of the first potting part in the sealing direction.

$$P \leq 16 \quad (1)$$

In the cartridge type hollow fiber membrane module of the present invention, a sealing surface of the outer potting part preferably has an arithmetic average roughness Ra of 1.6 µm or less.

In the cartridge type hollow fiber membrane module of the present invention, the potting material for forming the outer potting part preferably has a compressive yield stress at 125° C. of 10 MPa or more.

The housing of the cartridge type hollow fiber membrane module of the present invention preferably includes a cylindrical housing body, an upper cap mounted on a first vertical end of the housing body, and an upper sealing material that fixes a filtrate-side end of the first potting part liquid-tightly to the upper cap, wherein in a region surrounded by the upper sealing material, a dead-end space that lies below openings of the hollow fiber membranes preferably has a depth of 2 mm or less.

In the cartridge type hollow fiber membrane module of the present invention, the potting material for forming the outer potting part preferably has a tensile strength at 80° C. of 5 MPa or more.

In the cartridge type hollow fiber membrane module of the present invention, the potting material for forming the outer potting part is preferably an epoxy resin, and a curing agent for the epoxy resin preferably includes an aliphatic amine.

The cartridge type hollow fiber membrane module of the present invention preferably includes a second potting part that bundles the hollow fiber membranes in a sealed state at a surface facing the first potting part, and the second potting part is preferably formed of the hollow fiber membranes and a potting material.

Effects of the Invention

The cartridge type hollow fiber membrane module of the present invention has a structure in which a potting part formed only of a hollow fiber membrane and a potting material is fixed to a housing or a cylindrical case with a sealing material. The potting material and the housing or the cylindrical case are not bonded, and, therefore, unlike conventional modules, the joint of the potting material and the housing or the cylindrical case will not be separated by a heat load of sterilization such as steam sterilization, and problems such as feed leakage and contamination are prevented. To ensure the sealability of the potting part, the potting part has a multilayer (two layers or more) structure, whereby the dimensional change of the sealing portion due to cure shrinkage of the potting material is reduced. Thus, the cartridge type hollow fiber membrane module of the present invention can be used repeatedly over a long period of time in fields requiring steam sterilization or warm water sterilization, such as fermentation industry, preparation of pharmaceuticals, food industry, and water treatment. The cartridge type hollow fiber membrane module of the present invention can be used over a long period of time also in fields requiring continuous high-temperature filtration, such as recovery of hot water such as sugar solution or boiler water. In particular, using the cartridge type hollow fiber membrane module of the present invention enables continuous fermentation that stably maintains high productivity over a long period of time, enabling low-cost and stable production of chemical products, fermentation products, in various fermentation industries.

BRIEF DESCRIPTION OF THE DRAWINGS

FIG. 1 is a schematic longitudinal sectional view of the cartridge type hollow fiber membrane module according to the first embodiment of the present invention;

FIG. 2 is a schematic longitudinal sectional view of the hollow fiber membrane cartridge of the module of FIG. 1;

FIG. 3 is an enlarged view of the first potting part of the module of FIG. 1;

FIG. 4 is a view of a cross section taken along the line A-A of the module of FIG. 1;

FIG. 5 is a view of a cross section taken along the line B-B of the module of FIG. 1;

FIG. 6 is a schematic longitudinal sectional view of the cartridge type hollow fiber membrane module according to the second embodiment of the present invention;

FIG. 7 is a schematic longitudinal sectional view of the vicinity of the first potting part of the cartridge type hollow fiber membrane module according to the third embodiment of the present invention;

FIG. 8 is a schematic longitudinal sectional view of the vicinity of the first potting part of the cartridge type hollow fiber membrane module according to the fourth embodiment of the present invention;

FIG. 9 is a schematic longitudinal sectional view of the vicinity of the first potting part of the cartridge type hollow fiber membrane module according to the fifth embodiment of the present invention;

FIG. 10 is an enlarged view of the first potting part of the module of FIG. 9;

FIG. 11 is a flowchart illustrating an example of the method of manufacturing a cartridge type hollow fiber membrane module;

FIG. 12 is a schematic diagram illustrating an example of the method of manufacturing a hollow fiber membrane module;

FIG. 13 is a schematic diagram illustrating an example of the method of manufacturing a hollow fiber membrane module;

FIG. 14 is a schematic diagram illustrating an example of the method of manufacturing a hollow fiber membrane module;

FIG. 15 is a schematic diagram illustrating an example of the method of manufacturing a hollow fiber membrane module;

FIG. 16 is a schematic longitudinal sectional view of the vicinity of the first potting part of the hollow fiber membrane module of Comparative Example 1; and FIG. 17 is a schematic longitudinal sectional view of the vicinity of the first potting part of the hollow fiber membrane module of Example 4 and Comparative Example 5.

DESCRIPTION OF EMBODIMENTS

The cartridge type hollow fiber membrane module according to embodiments of the present invention will now be described in detail with reference to drawings. In the present invention, the terms "upper" and "lower" are based on states shown in the drawings and are merely for convenience; the side on which a feed flows in is defined as "lower" direction, and the side on which filtrate flows out as "upper" direction. In general, the upper and lower directions in postures of the hollow fiber membrane module during use correspond to the upper and lower directions in the drawings.

First Embodiment

The configuration of the cartridge type hollow fiber membrane module according to the first embodiment of the present invention will be described with reference to the drawings. FIG. 1 is a schematic longitudinal sectional view of the cartridge type hollow fiber membrane module according to the first embodiment of the present invention.

The cartridge type hollow fiber membrane module according to the first embodiment includes a housing, a plurality of hollow fiber membranes contained in the housing, a first potting part that bundles the plurality of hollow fiber membranes with its first end open, a second potting part that bundles the plurality of hollow fiber membranes with its second end sealed, and a sealing portion that liquid-tightly seals between the first potting part and the housing.

Module Structure

As shown in FIG. 1, a cartridge type hollow fiber membrane module 101A includes a housing and a hollow fiber membrane cartridge 100 (FIG. 2) contained in the housing.

The housing is composed of a hollow housing body 3, and an upper cap 4 and a lower cap 5 provided at each end of the housing body 3.

As shown in FIG. 1, the upper part of the housing body 3 is connected liquid-tightly and air-tightly with the upper cap 4 having a filtrate outlet 7, and the lower part of the housing body 3 with the lower cap 5 having a feed inlet 6.

The upper cap 4 and the lower cap 5 are each fixed to the housing body 3 using a gasket 17 with a clamp or the like as shown in FIG. 1, for example.

The housing body 3 has flanges 3A and 3B at its upper end and lower end around the circumference of the housing body 3. On the side of the housing body 3, a feed outlet 8 is provided near the filtrate outlet 7.

The upper cap 4 has an inner diameter substantially equal to the inner diameter of the housing body 3 and tapers upward to form the filtrate outlet 7. At the lower end of the upper cap 4, a step 4A, which is for forming a groove when the upper cap 4 is connected with the housing body 3, is formed around the circumference of the upper cap 4. When the housing body 3 is connected with the upper cap 4, the lower end of the upper cap 4 comes into contact with the flange 3A of the housing body 3 to form a groove (fixing part), and this groove (fixing part) fixes a flange 11D of a first potting part 11 described below.

The lower cap 5 has an inner diameter substantially equal to the inner diameter of the housing body 3 and tapers downward to form the feed inlet 6.

FIG. 4 is a view of a cross section taken along the line A-A at a first potting position of the module of FIG. 1.

Cartridge

As shown in FIG. 2, the hollow fiber membrane cartridge 100 includes a hollow-fiber membrane bundle 2 including a plurality of hollow fiber membranes 1 and potting parts that are provided at both ends of the hollow-fiber membrane bundle 2 and each bond the hollow fiber membranes 1 to each other. As the potting parts, the hollow fiber membrane cartridge 100 has the first potting part 11 disposed on the side of the filtrate outlet 7 of the housing and a second potting part 12 disposed on the side of the feed inlet 6 of the housing.

First Potting Part

The first potting part 11 disposed on the side of the filtrate outlet 7 of the housing, that is, at the upper end of the hollow fiber membrane cartridge 100 is formed of a potting material bonding the hollow fiber membranes 1 to each other at a first end of the hollow-fiber membrane bundle 2.

The hollow-fiber membrane bundle 2 is bundled with the upper end face of the hollow fiber membranes 1 open. The first potting part 11 is cylindrical, and at its upper end, the flange 11D is provided around the circumference of the first potting part 11. On the side of the first potting part 11, a step 11E is provided around the circumference. The step 11E makes the outer diameter of the upper part of the first potting part 11 larger than the outer diameter of the lower part.

The flange 11D of the first potting part 11, as a result of mounting the upper cap 4 on the housing body 3, is positioned in the groove (fixing part) formed between the housing body 3 and the upper cap 4. The first potting part 11 is thus fixed to the upper end of the housing body 3. Between the step 11E of the first potting part and the housing body 3, an O-ring 15 is disposed to fix the first potting part liquid-tightly and air-tightly. Here, the first potting part 11 is fixed liquid-tightly and air-tightly by squeezing the O-ring 15 in the radial direction of the hollow fiber membrane module (the transverse direction in FIG. 1). To ensure the sealability, the squeeze of the O-ring is preferably 8% to 30%.

As described above, the first potting part 11 is not bonded directly to the housing body 3 but fixed liquid-tightly and air-tightly by the O-ring 15. Therefore, unlike conventional hollow fiber membrane modules, the housing and the potting material will not be separated by heat treatment, thereby not causing a problem such as leakage of a feed to the filtrate side or contamination. Fixing the first potting part liquid-tightly and air-tightly with a sealing material such as an O-ring is hereinafter referred to as sealing, and a portion fixed with the sealing material as a sealing portion.

To fix the first potting part 11 liquid-tightly and air-tightly with the O-ring 15, it is necessary to stabilize the dimension of the step 11E. As a potting material, a resin such as an epoxy resin or a polyurethane resin is used, and such a potting material, which is cured by mixing two components, undergoes a volume shrinkage during curing. If the shrinkage results in a dimensional change or deformation of the step 11E, the first potting part cannot be sealed with a sealing material such as an O-ring, and a feed may leak to the filtrate side.

Thus, in the cartridge type hollow fiber membrane module according to this embodiment, the first potting part 11 includes an inner potting part 11A and an outer potting part 11B. Such a configuration that the potting part is formed of more than one layer reduces the dimensional change of the potting part due to cure shrinkage of a potting material, whereby the sealability of a sealing material is ensured.

More particularly, the outer potting part 11B may be formed outside the inner potting part 11A after the inner potting part 11A has sufficiently been shrunk on curing. At the time when the outer potting part 11B is formed, the inner potting part 11A has already been shrunk on curing, and, therefore, the final dimensional change of the external shape of the first potting part 11 is derived only from cure shrinkage of the outer potting part 11B. For such a reason, the dimensional change is reduced as compared to the case where the potting part is composed of a single layer.

Furthermore, since the reduced dimensional change in the sealing direction leads to improved sealability, both the inner potting part and the outer potting part need to be formed in the sealing direction. The sealing direction is a direction in which a sealing material is squeezed when the first potting part is fixed with the sealing material. In FIG. 3, for example, the O-ring 15 is squeezed in the transverse direction, and the cross-section taken along the O-ring 15 (A-A cross-section in FIG. 1) includes both the inner potting part 11A and the outer potting part 11B (FIG. 4).

The inner potting part may be of simple shape, e.g., cylindrical. In this embodiment, structures provided on the surface of the first potting part 11, such as the flange 11D and the step 11E, are defined by the outer potting part 11B. The present invention, however, is not limited to this configuration, and, for example, the inner potting part 11A may also include structures such as a step and a flange.

In this embodiment, the outer potting part 11B is in contact with a sealing member. In other words, the outer surface of the first potting part 11 is defined by the outer potting part 11B.

The smaller the proportion of the outer potting part 11B in the first potting part 11 is, the smaller the overall dimensional change can be. To reduce the dimensional change of the first potting part and ensure the sealability, the first potting part 11 preferably has a proportion of length P (%) at the sealing portion of the first potting part 11 satisfies Expression (1) below, wherein P (%) represents the proportion of the length of the outer potting part in the sealing direction in the length of the first potting part in the sealing direction.

$$P \leq 16 \quad (1)$$

The sealing portion is a portion of the first potting part, where a sealing material such as an O-ring or a gasket is mounted. In the cartridge type hollow fiber membrane module 101A of FIG. 1, the potting part is sealed with the O-ring 15 in the radial direction of the module. The length of the outer potting part in the sealing direction is D2a+D2b in FIG. 3, and the length of the first potting part in the sealing direction is D in FIG. 3.

Epoxy resins and polyurethane resins used as a potting material usually have a cure shrinkage (linear shrinkage) of about 0.2 to 1%. P in Expression (1) above may be appropriately set within the above range according to the cure shrinkage of a potting material used.

For example, in the case where the cure shrinkage of a potting material is 1%, the first potting part of a monolayer structure undergoes a 1% dimensional change. Since the cure shrinkage does not occur uniformly, the sealing portion of the first potting part becomes distorted. As a result, there may be places where the sealing material cannot be squeezed sufficiently, and a feed may leak to the filtrate side.

On the other hand, the first potting part of a two-layer structure of an inner potting part and an outer potting part undergoes a reduced dimensional change. Specifically, when the cure shrinkage of a potting material is 1% and P in Expression (1) above is 16% or less, the dimensional change is reduced to 0.3%, leading to improved sealability.

The thickness of the outer potting part is preferably 2 mm or more, more preferably 4 mm or more. When the thickness of the outer potting part is in this preferred range, a sufficient flow path is ensured between the inner potting part and a potting cap, and bubbles and the like are unlikely to remain during potting, preventing defects from occurring at the sealing portion.

In this embodiment, the whole first potting part is formed of a potting material. The outermost layer of the first potting part 11, that is, a part of the first potting part 11 which is in contact with the O-ring 15 is an outer potting part. The part of the outer potting part which is in contact with the O-ring 15 is referred to as a sealing surface, and to ensure the sealability, the sealing surface preferably has an arithmetic average roughness Ra of 1.6 µm or less. When the arithmetic average roughness Ra of the sealing surface is in this preferred range, a gap is unlikely to occur between the sealing surface and the sealing material, and leakage is prevented from occurring. The arithmetic average roughness of the sealing surface of 1.6 µm or less can be achieved, for example, by using a potting cap for potting whose surface that forms the sealing surface has an arithmetic average roughness Ra of 1.6 µm or less. The potting material such as epoxy resin or polyurethane is loaded into a potting cap in a liquid state and then cured, and if the arithmetic average roughness Ra of the surface of the potting cap is 1.6 µm or less, then the arithmetic average roughness Ra of the surface of the potting material cured in contact with the surface of the potting cap can be 1.6 µm or less. The material of the potting cap used is preferably one that releases the potting material well, and examples include fluorine resins, polypropylene, polyacetal, and polyethylene.

For example, when a case in which the outermost layer of a potting part is formed in advance, such as a hollow fiber membrane module 102 in FIG. 16, is used, that is, when the potting part includes a case and a potting material filled in the case, cure shrinkage of the potting material causes a tensile stress between the potting part and the case, and separation is likely to occur.

However, according to the configuration of this embodiment, the first potting part 11 is formed of the inner potting part 11A and the outer potting part 11B alone. In other words, the whole first potting part 11 is formed of a potting material. Such a configuration does not cause a tensile stress between the inner potting part 11A and the outer potting part 11B, and separation is unlikely to occur.

The potting material for use in the inner potting part and the outer potting part of the cartridge type hollow fiber membrane module may be of any type as long as it has sufficient properties such as adhesive strength to members to be bonded, heat resistance, and chemical durability, and it is preferable to use an epoxy resin or a polyurethane resin, for example. Epoxy resins and polyurethane resins, many of which are excellent in adhesion to hollow fiber membranes, heat resistance, and chemical durability, are suitable for use as a potting material of the cartridge type hollow fiber membrane module according to this embodiment.

The potting material for forming the outer potting part preferably has a compressive yield stress at 125° C. of 10 MPa or more, more preferably 15 MPa or more. In steam sterilization, it is necessary to raise the temperature of a sterilizing portion to 121° C. or higher, but actually, the steam sterilization is often carried out while supplying steam at about 125° C. to 130° C. because the temperature decreases because of heat radiation. When the compressive yield stress of the potting material at 125° C. is in the above preferred range, the sealing surface of the outer potting part, even when pushed by the sealing material as a result of expansion during steam sterilization, is resistant to plastic deformation, and depressions are unlikely to occur. Since depressions due to plastic deformation are unlikely to occur, depressions are unlikely to remain on the sealing surface when the potting material is shrunk by returning the temperature to normal temperature, as a result of which a sufficient squeeze of the sealing material is ensured, and leakage is effectively prevented from occurring.

The potting material for forming the outer potting part preferably has a tensile strength at 80° C. of 5 MPa or more, more preferably 10 MPa or more. To effectively prevent a decrease in tensile strength, it is preferable to use a potting material having a glass transition point of 80° C. or higher. The cartridge type hollow fiber membrane module of the present invention can also be used to filter a high-temperature liquid. For example, in the case of a highly concentrated sugar solution, filtration is sometimes carried out with the viscosity being reduced by raising the temperature to 60° C. to 80° C. In the cartridge type hollow fiber membrane module 101A, the movement of the first potting part in the axial direction is restricted by sandwiching the flange 11D of the first potting part between the flange 3A of the housing body 3 and the step 4A of the upper cap 4, and when a pressure difference is produced through filtration or backwashing between the feed side and the filtrate side of the module, a stress is generated to push the flange 11D of the first potting part upward or downward. In this case, if the tensile strength at 80° C. of the potting material for forming the outer potting part is in the above preferred range, the flange 11D is less prone to cracking even when a stress is generated during filtration of a high-temperature solution or backwashing, and the first potting part is less likely to be dislocated, as a result of which leakage is effectively prevented from occurring. In the cartridge type hollow fiber membrane module 101A, the movement of the first potting part in the axial direction is restricted by the flange 11D of the first potting part, and to ensure the sealability of a sealing material, it is necessary to provide the first potting part with a supporting step to restrict the movement of the first potting part in the axial direction. Therefore, also in the case of configurations other than the cartridge type hollow fiber membrane module 101A, the first potting part has a portion where the stress as described above is generated during filtration or backwashing.

As a potting material for use in the outer potting part of the hollow fiber membrane module of the present invention, for example, an epoxy resin or polyurethane can be used, and from the viewpoint of heat resistance, it is preferable to use an epoxy resin. Epoxy resins are cured by reacting a base resin with a curing agent, and examples of the base resin include bisphenol A type epoxy resins, bisphenol F type epoxy resins, novolac type epoxy resins, naphthalene type epoxy resins, biphenyl type epoxy resins, and cyclopentadiene type epoxy resins. These may be used alone or in combination of two or more. Examples of the curing agent include aliphatic amines, polyether amines, aromatic amines, and organic acid anhydrides, among which aliphatic amines and modified compounds thereof are preferred. Aliphatic amines, which are reactive and promote the reaction even in an atmosphere at normal temperature, provide an epoxy resin having a high compressive yield stress and a high tensile strength at a high temperature. Examples of aliphatic amines include triethylenetetramine, dimethylaminopropylamine, diethylenetriamine, tetraethylenepentamine, dipropylenediamine, hexamethylenediamine, N-aminoethylpiperazine, m-xylenediamine, and modified compounds thereof. These may be used alone or in combination of two or more. Furthermore, any other type of curing agent such as polyether amine, polyamide, and amine adduct can be used in combination to the extent that the heat resistance of a reactant is not impaired.

However, when an aliphatic amine is used as a curing agent, the heat of reaction may increase the temperature to as high as 100° C. or higher, leading to smoking or melting of a potting cap. To reduce heat generation, adding a filler such as silica, glass fiber, or calcium carbonate is effective, and the proportion of the filler in a potting material is preferably 20% by weight to 80% by weight. When the proportion of the filler is in this preferred range, heat generation is effectively reduced, and in addition, the viscosity is not too high, which is suitable for potting. Adding a filler also improves the compressive yield stress and the tensile strength. When a filler such as silica is used, the adhesive strength between an epoxy resin and the filler can be improved by adding a silane coupling agent. Particularly in the case of a large hollow fiber membrane module including a first potting part with a diameter of 100 mm or more, the specific surface area of the first potting part is small, and the amount of heat radiation is small, as a result of which the temperature tends to increase because of heat generation during reaction, leading to the above-described problems such as smoking. However, the outer potting part of the cartridge hollow fiber membrane module of the present invention is disposed only at the outside of the inner potting part and has a large specific surface area, and, therefore, the amount of heat radiation is large, as a result of which an excessive temperature increase is prevented even in the case of a large hollow fiber membrane module including a first potting part with a diameter of 100 mm or more.

For the inner potting part, the temperature tends to increase because the amount of heat radiation is small, and, therefore, it is preferable to use a potting material that generates a smaller amount of reaction heat than the outer potting part particularly in the case of a large hollow fiber membrane module including a first potting part with a diameter of 100 mm or more. The potting material of the inner potting part is preferably one having sufficient heat resistance, and, for example, an epoxy resin or polyurethane can be used. When an epoxy resin is used, examples of the base resin include bisphenol A type epoxy resins, bisphenol F type epoxy resins, novolac type epoxy resins, naphthalene type epoxy resins, biphenyl type epoxy resins, and cyclopentadiene type epoxy resins. These may be used alone or in combination of two or more. Examples of the curing agent include polyether amine, polyamide, and amine adduct. These may be used alone or in combination of two or more. Furthermore, any other type of curing agent such as aliphatic amine can be used in combination to the extent that excess reaction heat is not generated. To the epoxy resin, a filler such as silica, glass fiber, or calcium carbonate may be added.

Polyurethane can be obtained by reacting isocyanate with polyol. When polyurethane is used as a potting material of the inner potting part, examples of the isocyanate include tolylene diisocyanate (TDI), diphenylmethane diisocyanate (MDI), polymethylene polyphenyl isocyanate (polymeric MDI), and xylylene diisocyanate (XDI). These may be used alone or in combination of two or more. Examples of the polyol include polybutadiene-based polyols, dimer acid-modified polyols, epoxy resin-modified polyols, and polytetramethylene glycol. These may be used alone or in combination of two or more. Furthermore, any other type of polyol such as castor oil polyol, polycarbonate diol, and polyester polyol can be used in combination to the extent that the moist-heat resistance of a reactant is not impaired.

For the inner potting part and the outer potting part, it is preferable to use potting materials having similar linear expansion coefficients. When the linear expansion coefficients of the inner potting part and the outer potting part are similar, the difference in thermal expansion during steam heating is small, as a result of which the stress that generates between the inner potting part and the outer potting part is small, and separation is unlikely to occur.

The first potting part may have a multilayer (three layers or more) structure. In this case, the potting layer located outermost in the sealing direction is an outer potting part. Furthermore, the inner potting part may be divided into a plurality of parts, and the interspace between the plurality of inner potting parts and its whole circumference may be formed of an outer potting part.

In the first embodiment, the hollow fiber membranes 1 are bonded only by the inner potting part 11A, as shown in FIG. 4, but the hollow fiber membranes 1 can be bonded also in the outer potting part 11B.

Second Potting Part

On the side of the feed inlet 6 of the housing, the second potting part 12, the lower end of the hollow fiber membrane cartridge 100, is disposed. The second potting part 12, at which a second end of the hollow fiber membranes 1 is located, includes the hollow-fiber membrane bundle 2 including a plurality of the hollow fiber membranes 1 and a second potting part case 13 bonded to the hollow-fiber membrane bundle 2 with a potting material. The hollow portions of the hollow fiber membranes 1 are sealed with a potting material and not open. The second potting part case 13 has a cylindrical shape having a bottom on its lower side, and its outer diameter is smaller than the inner diameter of the housing body 3. The second potting part 12 has a through hole 14, which serves as a flow path of a feed.

The potting material for use in the second potting part of the cartridge type hollow fiber membrane module may be of any type as long as it has sufficient properties such as adhesive strength to members to be bonded, heat resistance, and chemical durability, and, for example, an epoxy resin or a polyurethane resin can be used.

FIG. 5 is a view of a cross section taken along the line B-B at a second potting position of the module of FIG. 1.

Hollow Fiber Membrane

The cartridge type hollow fiber membrane module according to this embodiment includes a hollow fiber membrane as a separation membrane. Hollow fiber membranes are advantageous because they typically have a larger specific surface area than flat membranes and are capable of filtering a larger amount of liquid per unit time. Hollow fiber membranes include symmetric membranes having a generally uniform pore size, asymmetric membranes having a pore size that varies in the thickness direction of the membrane, and composite membranes having a support layer for retaining strength and a separating functional layer for separating an object substance.

The average pore size of the hollow fiber membranes may be selected as appropriate according to the substance to be separated, and in the case of, for example, separating microorganisms such as bacteria and fungi and animal cells, the average pore size is preferably 10 nm to 220 nm. An average pore size of less than 10 nm may lead to low water permeability, and an average pore size of more than 220 nm may lead to leakage of microorganisms and the like. In the case of separating, for example, low-molecular-weight proteins, it is preferable to use a hollow fiber membrane having an average pore size of 2 nm to 20 nm. The average pore size in the present invention is defined as the pore size of a compact layer having a smallest pore size.

The separation membrane may be of any material, and the separation membrane can contain, for example, fluorine resins such as polytetrafluoroethylene, polyvinylidene fluoride, polyvinyl fluoride, tetrafluoroethylene/hexafluoropropylene copolymer, and ethylene/tetrafluoroethylene copolymer, cellulose esters such as cellulose acetate, cellulose acetate propionate, and cellulose acetate butyrate, polysulfone resins such as polysulfone and polyethersulfone, and resins such as polyacrylonitrile, polyimide, and polypropylene. In particular, a separation membrane including fluorine resins and polysulfone resins is suitable for use in the cartridge type hollow fiber membrane module for its high heat resistance, high physical strength, and high chemical durability.

The hollow fiber membrane may further contain a hydrophilic resin in addition to fluorine resins and polysulfone resins. The hydrophilic resin can increase the hydrophilicity of the separation membrane and improve the water permeability of the membrane. The hydrophilic resin may be any resin that is able to impart hydrophilicity to the separation membrane and is not limited to a specific compound, and for example, cellulose esters, fatty acid vinyl esters, vinyl pyrrolidone, ethylene oxide, propylene oxide, polymethacrylic acid ester resins, and polyacrylic acid ester resins are suitable for use.

When a hollow fiber membrane cartridge is manufactured, hollow fiber membranes are loaded into a potting cap and fixed with a potting material. To increase the handleability and prevent adhesion failure, the hollow fiber membranes are dried in advance. However, most of the hollow fiber membranes disadvantageously shrink upon drying to decrease their water permeability, and, therefore, the hollow fiber membranes are immersed in an aqueous glycerin solution before being dried. When the hollow fiber membranes are immersed in an aqueous glycerin solution before being dried, glycerin remains in pores to prevent dry shrinkage, and subsequent immersion in a solvent such as ethanol can recover the water permeability.

The cartridge type hollow fiber membrane module can be used after being steam sterilized, but some type of hollow fiber membranes shrink upon steam sterilization. Therefore, if steam sterilization is performed after the module is manufactured, shrinkage of hollow fiber membranes may cause the hollow fiber membranes to be damaged or cause the hollow fiber membranes to be separated from a potting material. Thus, it is desirable to manufacture a module in such a manner that hollow fiber membranes are steamed and shrank in advance, and then potting is carried out. Steam sterilization is typically carried out at 121° C. or higher, and, therefore, it is desirable to perform a pretreatment using steam at 121° C. or higher.

Sealing Material

The sealing materials for use in the cartridge type hollow fiber membrane module, such as an O-ring and a gasket, may be of any material as long as they have sufficient properties such as heat resistance and chemical durability, and, for example, fluorine rubber, silicone rubber, and ethylene propylene diene rubber (EPDM) can be used.

Materials of Housing and Cylindrical Case

The housing for use in the cartridge type hollow fiber membrane module may be of any material as long as it has sufficient properties such as heat resistance and chemical durability, and examples include polysulfone resins, fluorine resins such as polytetrafluoroethylene and perfluoroalkoxy fluororesins, polycarbonate, polypropylene, polymethylpentene, polyphenylene sulfide, polyether ketone, stainless steel, and aluminum. The materials of the cylindrical case and the second potting part case for use in the cartridge type hollow fiber membrane module may be any materials, and, for example, can be selected from the same materials as those of the housing.

Second Embodiment

The configuration of a cartridge type hollow fiber membrane module 101B according to the second embodiment of the present invention will be described with reference to the drawing. FIG. 6 is a schematic longitudinal sectional view of the cartridge type hollow fiber membrane module 101B according to the second embodiment. It should be noted that for unmentioned part of the configuration of the cartridge type hollow fiber membrane module 101B, the same structure as that of the cartridge type hollow fiber membrane module 101A of the first embodiment can be applied. Members having the same function as that of the members described in the first embodiment are represented by the same symbol and not described.

The cartridge type hollow fiber membrane module 101B according to the second embodiment has the same structure as that of the cartridge type hollow fiber membrane module 101A of the first embodiment except that the first potting part 112 further include a protective potting part 11C. The protective potting part 11C is provided on the undersurface (the surface of the first potting part 112 facing the second potting part 12: the surface of the first potting part 112 through which hollow fiber membranes are extending) of the first potting part 112.

Generally in a module, when a feed is flown, hollow fiber membranes are subjected to great stress at the end face of a potting part by contact with the potting part, as a result of which the hollow fiber membranes are prone to breakage here.

In contrast, in this embodiment, the first potting part 112 includes the protective potting part 11C formed of a potting material having high elasticity. When the hollow fiber membranes 1 are shaken by liquid flow or air scrubbing, the protective potting part 11C stretches to follow the movement of the hollow fiber membranes 1, thereby reducing the stress on the hollow fiber membranes 1. In this manner, the protective potting part 11C reduces the stress on the hollow fiber membranes 1 due to contact between the hollow fiber membranes 1 and the first potting part 112 at the undersurface of the first potting part 112, thereby preventing the hollow fiber membranes 1 from breaking.

The potting material for forming the protective potting part 11C preferably has sufficient heat resistance and an elasticity of 30% or more, more preferably 50% or more. For the protective potting part 11C, for example, epoxy resins, polyurethane resins, and silicone resins can be used. The elasticity of the protective potting part 11C is preferably higher than the elasticities of the inner potting part and the outer potting part.

The second potting part 12 of the cartridge type hollow fiber membrane module 101B may also be formed only of the hollow-fiber membrane bundle 2 and a potting material as shown in FIG. 6. In the second potting part, the hollow portions of the hollow fiber membranes are also sealed with a potting material, and, therefore, a feed is never to leak to the filtrate side even when the second potting part case 13 and the potting material of the first embodiment (FIG. 1) are separated. When the second potting part case 13 and the potting material are separated, however, the second potting part case 13 may be detached, or turbid substances may be deposited into a gap resulting from the separation. These problems can be prevented by forming the second potting part 12 using the hollow-fiber membrane bundle 2 and the potting material alone.

The second potting part 12 may be hung from the hollow-fiber membrane bundle 2, as shown in FIG. 6, or may be held using a pin or the like to restrict the movement in the axial direction of the module. Restricting the movement of the second potting part 12 in the axial direction using a pin or the like can prevent, for example, breakage of the hollow fiber membranes due to a downward movement of the second potting part 12 and bending of the hollow fiber membranes due to an upward movement of the second potting part 12. In this case, it is preferable to use a potting material having sufficient strength because a load is applied to a part of the second potting part 12 where the pin is in contact.

Third Embodiment

The configuration of a cartridge type hollow fiber membrane module 101C according to the third embodiment of the present invention will be described with reference to the drawing.

FIG. 7 is a schematic longitudinal sectional view of the vicinity of a first potting part of the cartridge type hollow fiber membrane module 101C according to the third embodiment. For unmentioned part of the configuration of the cartridge type hollow fiber membrane module 101C, the same structure as that of the cartridge type hollow fiber membrane module 101A of the first embodiment can be applied. Members having the same function as that of the members described in the first embodiment are represented by the same symbol and not described. The cartridge type hollow fiber membrane module 101C according to the third embodiment has substantially the same configuration as that of the cartridge type hollow fiber membrane module 101A of the first embodiment except that a cylindrical case 9 is included.

The cylindrical case 9 is a substantially cylindrical member and contained in the housing body 3 such that the height direction of the cylinder is along the height direction of the housing body 3. On the exterior of the cylindrical case 9, a flange 9A and a step 9B are provided. The flange 9A is a radially outward projection provided at the upper end of the cylindrical case 9 around the perimeter of the cylindrical case 9. The step 9B is also provided around the perimeter of the cylindrical case 9. The step 9B makes the outer diameter of the upper part of the cylindrical case 9 larger than the outer diameter of the lower part.

For the purpose of preventing an uneven flow of a feed during filtering operation, the cylindrical case 9 is provided with distribution holes 10 near the feed outlet 8 of the housing body 3. In cross-flow filtration, the feed flows into the module through the feed inlet 6 and flow out through the feed outlet 8. The distribution holes 10 prevents the feed flow in the module from leaning to the side of the feed outlet 8.

The upper cap 4 further include a step 4B provided below the step 4A. The step 4B, similarly to the step 4A, is formed around the circumference of the upper cap 4. When the upper cap 4 is mounted on the housing body 3, a groove is formed between the upper surface of the flange 3A of the housing body and the step 4B. The flange 9A of the cylindrical case 9 fits into this groove. In other words, the cylindrical case 9 is fixed to the housing body 3 by sandwiching the flange 9A between the upper cap 4 and the housing body 3.

The inner diameter of the cylindrical case 9 is smaller than the diameter of the step 4A of the upper cap 4. Thus, in a state where the cylindrical case 9 is fixed to the housing body 3, a groove is formed between the upper surface of the cylindrical case 9 and the step 4A of the upper cap 4.

The first potting part 113 is contained in the cylindrical case 9. The flange 11D of the first potting part fits into the groove formed between the upper surface of the cylindrical case 9 and the step 4A of the upper cap 4. Furthermore, a gasket 18 is disposed on the upper part (the filtrate side) of the first potting part. In other words, the first potting part 113 is fixed to the cylindrical case and to the housing by sandwiching the flange 11D together with the gasket 18 between the upper cap 4 and the cylindrical case 9.

The gasket 18 serves to isolate a dead-end space defined by the first potting part, the upper cap 4, the cylindrical case 9, and the O-ring 15 from a space on the filtrate side. In such a dead-end space, filtrate and steam drainage resulting from steam sterilization are likely to build up, leading to poor washability and poor sterilizability. To ensure the washability and the sterilizability of the module, it is preferable to isolate such a dead-end space using the gasket 18.

Between the step 11E of the first potting part and the inner surface of the cylindrical case 9, the O-ring 15 is disposed. Through the O-ring 15, the first potting part 113 is fixed to the cylindrical case 9 liquid-tightly and air-tightly. The O-ring 15 is squeezed between the cylindrical case 9 and the first potting part 113 in the radial direction of the module to thereby fix the first potting part liquid-tightly and air-tightly.

Between the step 9B of the cylindrical case and the housing body 3, an O-ring 16 is disposed. Through the O-ring 16, the cylindrical case 9 is fixed to the housing body 3 liquid-tightly and air-tightly.

In steam sterilization of the cartridge type hollow fiber membrane module 101C, if the lower part of the cylindrical case is in contact with the housing body 3, steam drainage may build up to result in an insufficient temperature rise, which can cause poor sterilization. To prevent a build-up of steam drainage, it is preferable to provide a clearance for discharging steam drainage between the lower part of the cylindrical case and the housing body 3, and the size of the clearance is preferably 1 mm or more.

Fourth Embodiment

The configuration of a cartridge type hollow fiber membrane module 101D according to the fourth embodiment of the present invention will be described with reference to the drawing.

FIG. 8 is a schematic longitudinal sectional view of the vicinity of a first potting part of the cartridge type hollow fiber membrane module 101D according to the fourth embodiment. For unmentioned part of the configuration of the cartridge type hollow fiber membrane module 101D, the same structure as those of the cartridge type hollow fiber membrane module 101A of the first embodiment and the cartridge type hollow fiber membrane module 101C of the third embodiment can be applied. Members having the same function as that of the members described in the first embodiment and the third embodiment are represented by the same symbol and not described. The cartridge type hollow fiber membrane module 101D according to the fourth embodiment has substantially the same configuration as that of the cartridge type hollow fiber membrane module 101C of the third embodiment except that a groove 11F and a support plate 24 are included.

The first potting part 114 has the inwardly recessed groove 11F midway in the height direction of the first potting part. The support plate 24 is inserted into the groove 11F, and the support plate 24 is fixed to the housing body 3, whereby the first potting part 114 is supported, and its movement in the axial direction is restricted.

Between the first potting part 114 and the cylindrical case 91, the O-ring 15 is disposed, and through the O-ring 15, the first potting part 114 is fixed to the cylindrical case 91 liquid-tightly and air-tightly. Between the cylindrical case 91 and the housing body 3, the O-ring 16 is disposed, and through the O-ring 16, the cylindrical case 91 is fixed to the housing body 3 liquid-tightly and air-tightly. On an end face (upper surface) on the filtrate side of the first potting part 114, a circumferentially continuous groove 11G is provided in the vicinity of the perimeter of the face. In the groove 11G, the gasket 18 is disposed. The gasket 18 is in contact with the step 4A of the upper cap to thereby fix the first potting part 114 liquid-tightly and air-tightly to the upper cap 4. Specifically, the gasket 18 is squeezed in the axial direction of the module to thereby fix the first potting part liquid-tightly and air-tightly. The groove 11G is formed by the outer potting part 11B.

Fifth Embodiment

The configuration of a cartridge type hollow fiber membrane module 101E according to the fifth embodiment of the present invention will be described with reference to the drawings. FIG. 9 is a schematic longitudinal sectional view of the vicinity of a first potting part of the cartridge type hollow fiber membrane module 101E according to the fifth embodiment, and FIG. 10 is an enlarged view of the first potting part 115 of the cartridge type hollow fiber membrane module 101E of FIG. 9.

For unmentioned part of the configuration of the cartridge type hollow fiber membrane module 101E, the same structure as those of the cartridge type hollow fiber membrane module 101A of the first embodiment and the cartridge type hollow fiber membrane module 101C of the third embodiment can be applied. Members having the same function as that of the members described in the first embodiment and the third embodiment are represented by the same symbol and not described.

The cartridge type hollow fiber membrane module 101E according to the fifth embodiment has substantially the same configuration as that of the cartridge type hollow fiber membrane module 101C of the third embodiment except that the first potting part 115 having a shape different from that of the first potting part 113 is included.

The cylindrical case 92 has substantially the same configuration as that of the cylindrical case 9 described above except that an interior step 9C is included. The interior step 9C is a radially inward projection on the inner surface of the cylindrical case 92 midway in the height direction of the cylindrical case 92. The interior step 9C is provided circumferentially on the inner surface of the cylindrical case 92.

The location and the sealing direction of the O-ring 16 are the same as in the third embodiment described above.

On an end face (upper surface) on the filtrate side of the first potting part 115, a circumferentially continuous groove 11G is provided in the vicinity of the perimeter of the face. In the groove 11G, the gasket 18 is disposed. The gasket 18 is in contact with the step 4A of the upper cap to thereby fix the first potting part 115 liquid-tightly and air-tightly to the upper cap 4. Specifically, the gasket 18 is squeezed in the axial direction of the module to thereby fix the first potting part liquid-tightly and air-tightly. The groove 11G is formed by the outer potting part 11B.

In this structure, a downwardly extending dead-end space defined by the first potting part 115, the cylindrical case 92, and the O-ring 15 is isolated from filtrate, as a result of which the filtrate is prevented from entering the downwardly extending dead-end space to form a liquid pool. This structure is excellent in washability.

When steam sterilization is necessary also on the filtrate side of the module, it is preferable to isolate the downwardly extending dead-end space using the gasket 18 because steam drainage may build up in the downwardly extending dead-end space to decrease the temperature and result in poor sterilization. For example, in a cartridge type hollow fiber membrane module 101F shown in FIG. 17, there is a space (downwardly extending dead-end space) on the groove 11G where the gasket 18 is absent. In this dead-end space, which lies below the end face of the hollow-fiber membrane bundle 2, undischarged steam drainage may build up. In steam sterilization, it is desirable to raise the temperature of a place to be sterilized to 121° C. or higher, and build-up of steam drainage is preferably as little as possible. To effectively raise the temperature in steam sterilization, the depth (X) of the downwardly extending dead-end space is preferably 2 mm or less, and more preferably, there is no downwardly extending dead-end space (X≤0 mm).

In the cartridge type hollow fiber membrane module 101E of FIG. 9, the first potting part 115 is sealed using the O-ring 15 in the radial direction and the axial direction of the module. Furthermore, in this embodiment, the outer potting part 11B is disposed such that it covers the lateral surface and the undersurface of the inner potting part 11A, as a result of which both the inner potting part 11A and the outer potting part 11B are formed in two sealing directions (i.e., the radial direction and the axial direction). In the radial sealing direction, the length of the outer potting part is D2a+D2b in FIG. 10, and the length of the first potting part is D. In the axial sealing direction, the length of the outer potting part is L2a+L2b, and the length of the first potting part of a sealing portion is L.

Method of Manufacturing Hollow Fiber Membrane Cartridge

A method of manufacturing a hollow fiber membrane cartridge in a cartridge type hollow fiber membrane module will now be described.

As a potting method, either the centrifugal potting method in which a liquid potting material is allowed to penetrate between hollow fiber membranes by using a centrifugal force and then cured or the static potting method in which a liquid potting material is fed from a metering pump or a head to flow spontaneously, allowed to penetrate between the hollow fiber membranes 1, and then cured may be used.

The centrifugal potting method is advantageous in that a potting material is allowed to easily penetrate between hollow fiber membranes by a centrifugal force, and high-viscosity potting materials can also be used. When a polyurethane resin is used as a potting material for bonding the hollow fiber membranes 1, water in the hollow fiber membranes 1 reacts with isocyanate to produce carbon dioxide, causing bubbles, and, therefore, it is difficult to use a polyurethane resin in the static potting method. In the centrifugal potting method, a polyurethane resin can be used as a potting material for bonding the hollow fiber membranes 1 because the centrifugal force creates a pressure toward the ends of the module to expel the bubbles inwardly. On the other hand, the static potting does not require large equipment such as centrifugal molding machines.

After potting is finished and the potting material is cured, a potting part at an end is cut to open the end face of the hollow fiber membranes 1. Before carrying out potting, it is desirable to perform a filling treatment for sealing hollow portions at the ends of the hollow fiber membranes 1 with a silicone adhesive or the like. The filling treatment can prevent the potting material from further coming into the hollow portions, thereby preventing the occurrence of impassable fibers in which the potting material fills the hollow portions to block filtrate.

In potting, the inner surface of the second potting part case 13 and the surface of the inner potting part 11A may be subjected to treatments such as filing, plasma treatment, and primer treatment to improve the adhesion.

A method of manufacturing the hollow fiber membrane cartridge 100 according to the first embodiment will now be described with reference to the flowchart of FIG. 11. It should be noted that the manufacturing method described below can be applied to cartridges in the modules of all the embodiments described above.

First, the hollow-fiber membrane bundle 2 is placed in the centrifugal potting apparatus shown in FIG. 12, and centrifugal potting is performed to form the inner potting part 11A as shown in FIG. 13 (step S1).

The central part of the hollow-fiber membrane bundle 2 is housed in a polyvinyl chloride cylindrical case 20, and a first end of the hollow fiber membranes 1 and a second end of the hollow fiber membranes 1 are inserted in a first potting cap 21A and the second potting part case 13, respectively. A pin 23 is inserted in each through hole in the bottom of the second potting part case 13, and the second potting part case 13 and the pin 23 are housed inside a second potting cap 22. The first end of the hollow fiber membranes 1 is preliminarily subjected to a filling treatment with a silicone adhesive. To the polyvinyl chloride cylindrical case 20, a potting material feeder 19 is connected, and the whole apparatus is rotated in a centrifugal molding machine to create a centrifugal force, whereby the potting material can be supplied to a potting cap 21A and the second potting part case 13. The potting material can be supplied to the potting cap 21A and the second potting part case 13 simultaneously or individually.

After the inner potting part 11A is formed, the potting cap 21A is removed, and the inner potting part 11A is cured and shrunk (step S2). In the cure shrinkage, heat treatment may be performed to promote the reaction. Although the cure shrinkage has already occurred during the centrifugal potting, further promoting the cure shrinkage in this step stabilizes the dimension of the first potting part.

In other words, the step of forming an inner potting part includes an inner potting material disposing step in which a potting material is filled between the hollow fiber membranes and a curing step in which the potting material is cured. In this embodiment, the inner potting material disposing step is carried out using the centrifugal potting of the step S1. Part of the curing step also proceeds in the step S1. Furthermore, the curing step is carried out also in the step S2 to complete the cure shrinkage of the inner potting part.

In the step S2, the curing is preferably carried out until there is no dimensional change due to curing reaction.

The heat treatment conditions for promoting the curing vary depending on the type of potting material for use and may be appropriately selected according to the type of potting material.

The inner potting part 11A is then mounted on potting caps 21B and 21C, and placed in a centrifugal potting apparatus to perform centrifugal potting, thereby forming the outer potting part 11B as shown in FIG. 14 (step S3). In this step, a sufficient clearance between the potting caps 21B and 21C and the inner potting part 11A facilitates entry of the liquid potting material, effectively preventing defects such as bubbles from occurring at the outer potting part 11B. Therefore, between the potting caps 21B and 21C and the inner potting part 11A, it is preferable to provide a clearance of 2 mm or more, more preferably 4 mm or more. Air in the potting caps is expelled by the centrifugal force to the inward direction of the potting caps (the direction to which the hollow fiber membranes extend). Therefore, to improve the expulsion of bubbles and prevent the bubbles from remaining in the potting material, the potting material is preferably fed from outside the potting cap (the end side of the hollow fiber membranes).

In the step S3, the outer potting part is disposed such that both the inner potting part 11A and the outer potting part 11B exist in the sealing direction when a cartridge is incorporated into a module. The outer potting part 11B is disposed such that it comes into contact with the O-ring 15 in the first potting part.

After the outer potting part 11B is formed by centrifugal potting, the potting caps 21B and 21C are removed, and the outer potting part 11B is cured and shrunk (step S4). In the cure shrinkage, heat treatment may be performed to promote the reaction.

As described above, curing proceeds also during the potting (during the step S3). Therefore, the step of disposing a potting material for forming the outer potting part 11B outside the inner potting part 11A is carried out in the step S3, and part of the step of curing the potting material also proceeds in the step S3. The step S4 further promotes the curing to completion.

The second end of the hollow fiber membranes 1 is inserted in the second potting part case 13. The pin 23 is inserted in each through hole in the bottom of the second potting part case 13, and the second potting part case 13 and the pin 23 are housed inside the second potting cap 22. Under these conditions, centrifugal potting is performed to form the second potting part 12 (step S5). In this step, the hollow portions at the second end of the hollow fiber membranes 1 are sealed with a potting material. Thereafter, the second potting cap 22 is removed; the pin 23 is pulled out to form the through hole 14; and the second potting part 12 is cured and shrunk (step S6). In the cure shrinkage, heat treatment may be performed to promote the reaction.

Finally, the line C-C in FIG. 15 is cut with a circular saw to open the first end of the hollow fiber membranes 1 (step S7), thereby manufacturing the hollow fiber membrane cartridge 100.

After the step S4, a step of providing the protective potting part 11C may be performed. The step of providing the protective potting part includes the steps of disposing a liquid potting material that, after being cured, will have an elasticity of 30% or more on the surface of the first potting part through which hollow fiber membranes are extending, and curing the potting material.

Manufacturing Hollow Fiber Membrane Module

The hollow fiber membrane cartridge 100 manufactured by the method described above is inserted into the housing body 3 and fixed with the O-ring 15, and the upper cap 4 and the lower cap 5 are attached, whereby the cartridge type hollow fiber membrane module 101A according to the first embodiment can be manufactured.

Method of Filtering Operation of Cartridge Type Hollow Fiber Membrane Module

A method of filtering operation of a cartridge type hollow fiber membrane module will be described. A feed flows through the feed inlet 6 of the lower cap 5 into the cartridge type hollow fiber membrane module 101A, and the feed that does not permeate the hollow fiber membranes 1 is discharged out of the cartridge type hollow fiber membrane module 101A through the feed outlet 8. The filtrate that has permeated through the hollow fiber membranes 1 from outside to inside passes through the hollow portions of the hollow fiber membranes 1 and is discharged out of the cartridge type hollow fiber membrane module 101A through the filtrate outlet 7 of the upper cap 4.

The filtering method in which the feed is fed parallel to the membrane surface as described above is called crossflow filtration, which effectively prevents substances in the feed, such as suspended matter, from accumulating on the membrane surface. Closing the feed outlet 8 enables dead-end filtration which filters all the feed. Furthermore, the hollow fiber membranes can be washed through air scrubbing by feeding air through the feed inlet 6. The air fed in is discharged through the feed outlet 8. Alternatively, the hollow fiber membranes can be backwashed by feeding a backwashing liquid through the filtrate outlet 7 to permeate through the hollow fiber membranes from inside to outside.

Method of Steam Sterilization of Cartridge Type Hollow Fiber Membrane Module

When a cartridge type hollow fiber membrane module is used in applications such as fermentation, steam sterilization is required. In steam sterilization, steam is typically fed from the upper side to the lower side of a pipe in order to discharge steam drainage produced. When the feed side area of the cartridge type hollow fiber membrane module 101A is steam sterilized, steam may be fed through the feed outlet 8 to discharge steam drainage through the feed inlet 6. When the filtrate side area of the cartridge type hollow fiber membrane module 101A is steam sterilized, steam may be fed through the filtrate outlet 7, or steam may be fed to the filtrate side of the module by feeding the steam through the feed outlet 8 to permeate the hollow fiber membranes 1. Steam drainage produced is discharged through the feed inlet 6. At this time, the through hole 14 provided in the second potting part serves also as a steam drainage outlet.

The present invention is not limited to the embodiments described above, and, for example, alterations and modifications can be made as appropriate. Furthermore, the material, shape, dimension, numerical value, configuration, number, place to be disposed, and the like of the elements in the embodiments described above may be freely selected and are not limited as long as the present invention can be achieved.

EXAMPLES

Measuring Compressive Yield Stress of Potting Material

The compressive yield stress at 125° C. of a potting material in Examples was measured by the nanoindentation method. The shape of potting material test pieces was a flat plate 5 mm in width, 5 mm in length, and 1 mm in height, and using TI 950 TriboIndenter manufactured by Hysitron, Inc., the compressive yield stress was determined by single indentation measurement using a spherical indenter having a tip shape of R: 300 nm.

Measuring Tensile Strength of Potting Material

The tensile strength at 80° C. of a potting material in Examples was measured using Autograph AGS-500NX manufactured by SHIMADZU CORPORATION. The shape of test pieces was that of the Dumbbell No. 4 type specimen defined in ISO 37, and the thickness was 2 mm. The testing speed was 2 mm/min.

Measuring Glass Transition Point of Potting Material

The glass transition point of a potting material in Examples was measured by DSC in accordance with ISO 3146. The apparatus used was EXSTAR6000 manufactured by Seiko Instruments Inc.

Measuring Arithmetic Average Roughness Ra of Sealing Surface

The arithmetic average roughness Ra of the sealing surface of an outer potting part was measured using Surftest-SV-2000N2 manufactured by Mitutoyo Corporation by running a detector along the axial direction of a hollow fiber membrane module.

Steam Heating of Hollow Fiber Membrane Module

Steam heating of a hollow fiber membrane module in Examples was performed by the following method. Steam at 125° C. is fed through the feed outlet 8, and steam blowing was performed for 3 minutes with the feed inlet 6 and the filtrate outlet 7 open. The filtrate outlet 7 was then closed, and a steam trap was mounted under the feed inlet 6 to discharge steam drainage produced. Thereafter, steam heating was continued at 125° C. for 60 minutes.

Air Leakage Test after Steam Heating

After the steam heating described above was performed 50 times, an air leakage test was carried out to evaluate the sealability of the hollow fiber membrane module. The feed inlet 6 is hermetically sealed, and compressed air at 100 kPa was fed through the feed outlet 8 with the filtrate outlet 7 open. When all the water existing on the feed side of the module was filtered, the feed outlet 8 was hermetically sealed, and the pressure change in 5 minutes at the feed side of the module was measured. If the sealability of the first potting part is insufficient, air leaks to the filtrate side, reducing the pressure at the feed side of the module. The hollow fiber membrane used is a hollow fiber membrane having a bubble point of at least 200 kPa, and pores are filled with water; therefore, air cannot permeate through the pores of the hollow fiber membrane. The bubble point is a pressure at which solvent in the pores of the membrane is pushed out and air permeates through the pores when a pressure at or higher than the bubble point is applied using compressed air.

Temperature of Upper Part of First Potting Part During Steam Heating

The temperature of the upper part of the first potting part during steam heating was measured by the following method. A thermocouple was brought into contact with the lowest position of first potting part (the bottom of a downwardly extending dead-end space, if present) and fixed with polyimide tape. The thermocouple used was a K type thermocouple available from RS Components Ltd. The cable of the thermocouple was drawn out through a hole made in the gasket at the connected portion. The steam heating of the hollow fiber membrane module was carried out by the method described above.

Evaluating Strength of Flange of First Potting Part

The strength of the flange 11D of the first potting part was evaluated by the following method. Warm water at 80° C. was fed through the feed inlet 6, and when the feed side of the module is filled with warm water, filtration was performed with the filtrate outlet 7 open and the feed outlet 8 closed. The filtration was carried out for 4 minutes at a pressure difference of 300 kPa between the feed side and the filtrate side of the module. Thereafter, warm water at 80° C. was fed through the filtrate outlet 7, and backwashing was performed with the feed outlet 8 open and the feed inlet 6 closed. The backwashing was carried out for 1 minute at a pressure difference of 300 kPa between the filtrate side and the feed side of the module. This combination (one cycle) of filtration and backwashing was repeated 10,000 cycles. In these cycles, the hollow fiber membrane cartridge was taken out every 1,000 cycles to check the presence of cracks around the flange 11. The flange 11D serves to restrict the movement of the first potting part in the axial direction of the module. On the flange 11D, an upward or downward stress is exerted by the pressure difference between the feed side and the filtrate side of the module during filtration or backwashing. When the strength of the first potting part is insufficient, the flange 11D undergoes cracking. When the flange 11D undergoes cracking and finally breaks, the first potting part may be dislocated to cause leakage.

Example 1

Producing Membrane

A vinylidene fluoride homopolymer having a weight average molecular weight of 417,000 in an amount of 38 parts by mass and γ-butyrolactone in an amount of 62 parts by mass were mixed and dissolved at 160° C. This polymer solution accompanied by a 85% by mass aqueous γ-butyrolactone solution, a liquid for forming a hollow portion, was discharged through a double-pipe spinneret and solidified in a cooling bath disposed 30 mm below the spinneret, the bath including a 85% by mass aqueous γ-butyrolactone solution at 20° C., to produce a hollow fiber membrane having a spherical structure. Thereafter, 14 parts by mass of a vinylidene fluoride homopolymer having a weight average molecular weight of 284,000, 1 part by mass of cellulose acetate propionate (Eastman Chemical Company, CAP482-0.5), 77 parts by mass of N-methyl-2-pyrrolidone, 5 parts by mass of polyoxyethylene sorbitan fatty acid ester (Sanyo Chemical Industries, Ltd., "Ionet" (registered trademark) T-20C), and 3 parts by mass of water were mixed and dissolved at 95° C. to prepare a polymer solution. This membrane-forming solution was applied uniformly to the surface of the hollow fiber membrane having a spherical structure and immediately solidified in a water bath to produce a hollow fiber membrane including the spherical-structure layer and a three-dimensional network structure formed thereon. The hollow fiber membrane obtained had an outer diameter of 1,350 μm, an inner diameter of 800 μm, and a membrane surface average pore size of 40 nm.

Manufacturing Hollow Fiber Membrane Cartridge

The hollow fiber membrane was cut to a length of 1,800 mm, immersed in a 30% by mass aqueous glycerin solution for 1 hour, and then air dried. This hollow fiber membrane was heat treated with water vapor at 125° C. for 1 hour, air dried, and cut to a length of 1,200 mm. Five thousand and four hundred hollow fiber membranes thus obtained were bundled together. The hollow-fiber membrane bundle was sealed with a silicone adhesive (Dow Corning Toray Co., Ltd., SH850A/B, a mixture of two components at a mass ratio of 50:50) at a first end side.

The hollow fiber membranes sealed at the first end side were placed in a centrifugal potting apparatus as shown in FIG. 12. Here, the hollow fiber membranes at the sealed first end side were inserted into the first potting cap 21A (inner diameter: 139.3 mm, inner side length: 92 mm) made of polypropylene, and a second end side of the hollow fiber membranes was inserted into the second potting part case 13 (inner diameter: 149 mm, outer diameter: 155 mm, inner side length: 40 mm) made of polysulfone. The inner surface of the second potting part case 13 made of polysulfone was preliminarily filed with sandpaper (#80) and degreased with ethanol. On the outside of the second potting part case 13, the second potting cap 22 was mounted. Here, into holes in the bottom of the second potting part case 13, 36 pins for forming through holes were inserted and fixed. The pins were each cylindrical 8 mm in diameter and 100 mm in length. The apparatus in which the potting caps were thus mounted at both ends of the hollow fiber membranes was placed in a centrifugal molding machine.

A bisphenol F type liquid epoxy resin (Huntsman Japan Co., Ltd., LST868-R14, filler content: 47% by mass) and polyether amine (Huntsman Japan Co., Ltd., "JEFFAMINE" (registered trademark) T-403) were mixed at a mass ratio of 100:32. The resulting mixture (epoxy resin solution) was placed in the potting material feeder 19, and the centrifugal molding machine was rotated to create a centrifugal force, thereby feeding the epoxy resin solution in the potting material feeder 19 into the first potting cap 21A. The amount of the epoxy resin solution fed into the first potting cap 21A was 1,020 g. The temperature in the centrifugal molding machine was 40° C. The number of rotations was 350 rpm. The centrifugation time was 5 hours. After the centrifugation, the first potting cap 21A was removed upon curing of the epoxy resin, and curing was further carried out at 100° C. for 2 hours. As a result of this, the inner potting part 11A of the first potting part 11 was formed. Thereafter, the surface of the inner potting part 11A was filed with sandpaper (#80) and degreased with ethanol.

The inner potting part 11A of the first potting part was then inserted into the first potting caps 21B and 21C made of polypropylene as shown in FIG. 14, and a centrifugal potting apparatus assembled in the same manner as in the case of the inner potting part 11A was placed in a centrifugal molding machine. The first potting cap 21B as shown in FIG. 14 had a minimum inner diameter portion of 149.3 mm and a maximum inner diameter portion of 157.3 mm, and the first potting cap 21C had a minimum inner diameter portion of 138.8 mm and a maximum inner diameter portion of 167 mm. The minimum inner diameter portion of the first potting cap 21B was a portion where an O-ring sealing surface was to be formed, and its arithmetic average roughness Ra was 1.4 μm. The minimum inner diameter portion of the first potting cap 21C was a portion where the flange 11D of the outer potting part is to be formed.

A bisphenol A type liquid epoxy resin (Mitsubishi Chemical Corporation, "jER" (registered trademark) 828), modified aliphatic amine (Nagase ChemteX Corporation, HY956), and polyether amine (Huntsman Japan Co., Ltd., "JEFFAMINE" (registered trademark) T-403) were mixed at a mass ratio of 100:18.5:11. The resulting mixture (epoxy resin solution) was placed in the potting material feeder 19, and the centrifugal molding machine was rotated to create a centrifugal force, thereby feeding the epoxy resin solution in the potting material feeder 19 into the first potting caps 21B and 21C. The amount of the epoxy resin solution fed into the first potting caps 21B and 21C was 870 g. The temperature in the centrifugal molding machine was 40° C. The number of rotations was 350 rpm. The centrifugation time was 8 hours.

After the centrifugation, the first potting caps 21B and 21C was removed upon curing of the epoxy resin, and curing was further carried out at 100° C. for 2 hours. As a result of this, the outer potting part 11B of the first potting part 11 was formed.

Thereafter, the first potting cap 21C was attached again to the first potting part 11 to assemble a potting apparatus, and a bisphenol F type liquid epoxy resin (Huntsman Japan Co., Ltd., LST868-R14, filler content: 47% by mass) and polyether amine (Huntsman Japan Co., Ltd., "JEFFAMINE" (registered trademark) T-403) were mixed at a mass ratio of 100:32. The resulting mixture (epoxy resin solution) was placed in the potting material feeder 19, and the centrifugal molding machine was rotated to create a centrifugal force, thereby feeding the epoxy resin solution in the potting material feeder 19 into the second potting part case 13. The amount of the epoxy resin solution fed into the second potting part case 13 was 750 g. The temperature in the centrifugal molding machine was 40° C. The number of rotations was 350 rpm. The centrifugation time was 5 hours. After the centrifugation, the first potting cap 21C, the second potting cap 22, and the pin 23 were removed upon curing of the epoxy resin, and curing was further carried out at 100° C. for 2 hours. As a result of this, the second potting part 12 having the through hole 14 was formed.

Thereafter, the first potting part was cut along the line C-C in FIG. 15 using a circular saw to open the first end of the hollow fiber membranes, thereby manufacturing a hollow fiber membrane cartridge. The outer potting part of the hollow fiber membrane cartridge had a compressive yield stress at 125° C. of 10 MPa and a glass transition point of 81° C. The arithmetic average roughness Ra of the sealing surface of the outer potting part was 1.6 μm, and P in Expression (1) was 6.7.

Evaluating Sealability of Cartridge Type Hollow Fiber Membrane Module

Subsequently, an O-ring was attached to the first potting part, and the hollow fiber membrane cartridge manufactured was mounted on the stainless-steel housing body 3 (inner diameter: 159.2 mm) as shown in FIG. 1. The upper cap 4 and the lower cap 5 were attached to the housing body to manufacture the cartridge type hollow fiber membrane module 101A. Into the cartridge type hollow fiber membrane module 101A, ethanol was fed and filtered to fill the pores of the hollow fiber membranes with ethanol. Subsequently, RO water was fed and filtered to replace ethanol with RO water.

For the cartridge type hollow fiber membrane module 101A, steam heating (125° C., 60 min) was carried out 50 times by the above-described method, and then an air leakage test was carried out by the above-described method. The decrease in pressure in 5 minutes was 0 kPa, showing that the sealability was ensured.

Example 2

The cartridge type hollow fiber membrane module 101A was manufactured in the same manner as in Example 1 except that the potting materials of the inner potting part and the outer potting part of the first potting part and the size of the inner potting part were changed. For the inner potting part of the first potting part, a mixture (polyurethane solution) of polymeric MDI (Huntsman Japan Co., Ltd., "Suprasec" (registered trademark) 5025), polybutadiene-based polyol (Cray Valley USA, LLC, Krasol LBH 3000), and 2-ethyl-1,3-hexanediol at a mass ratio of 57:100:26 was used. For the outer potting part of the first potting part, a mixture of a bisphenol F type liquid epoxy resin (Huntsman Japan Co., Ltd., LST868-R14), triethylenetetramine, and polyether amine (Huntsman Japan Co., Ltd., "JEFFAMINE" (registered trademark) T-403) at a mass ratio of 100:7:8.7 was used. The inner diameter of the first potting cap 21A for forming the inner potting part was 126 mm. The outer potting part of the hollow fiber membrane cartridge had a compressive yield stress at 125° C. of 30 MPa and a glass transition point of 90° C. The arithmetic average roughness Ra of the sealing surface of the outer potting part was 0.8 μm, and P in Expression (1) was 15.6.

For the cartridge type hollow fiber membrane module 101A, steam heating (125° C., 60 min) was carried out 50 times by the above-described method, and then an air leakage test was carried out by the above-described method. The decrease in pressure in 5 minutes was 0 kPa, showing that the sealability was ensured.

Example 3

The cartridge type hollow fiber membrane module 101A was manufactured in the same manner as in Example 1 except that the outer potting part of the first potting part was changed. For the outer potting part of the first potting part, a mixture of polymeric MDI (Huntsman Japan Co., Ltd., "Suprasec" (registered trademark) 5025), polybutadiene-based polyol (Cray Valley USA, LLC, Krasol LBH 3000), and 2-ethyl-1,3-hexanediol at a mass ratio of 57:100:26 was used. The outer potting part of the hollow fiber membrane cartridge had a compressive yield stress at 125° C. of 0.3 MPa and a glass transition point of 55° C. The arithmetic average roughness Ra of the sealing surface of the outer potting part was 1 μm, and P in Expression (1) was 6.7.

For the cartridge type hollow fiber membrane module 101A, steam heating (125° C., 60 min) was carried out 50 times by the above-described method, and then an air leakage test was carried out by the above-described method. The decrease in pressure in 5 minutes was 3 kPa.

Example 4

The cartridge type hollow fiber membrane module 101A was manufactured in the same manner as in Example 1 except that the arithmetic average roughness Ra of the O-ring sealing surface of the outer potting part of the first potting part was 64 μm.

For the cartridge type hollow fiber membrane module 101A, steam heating (125° C., 60 min) was carried out 50 times by the above-described method, and then an air leakage test was carried out by the above-described method. The decrease in pressure in 5 minutes was 2 kPa.

Comparative Example 1

Using the same hollow fiber membranes as in Example 1, the hollow fiber membrane module 102 having an integrated type structure as shown in FIG. 16 was manufactured. Into a polysulfone housing having an inner diameter of 159.2 mm, 6,300 hollow fiber membranes were inserted, and centrifugal potting was performed for both ends. The potting material used was a mixture of a bisphenol F type liquid epoxy resin (Huntsman Japan Co., Ltd., LST868-R14, filler content: 47% by mass), triethylenetetramine, and polyether amine (Huntsman Japan Co., Ltd., "JEFFAMINE" (registered trademark) T-403) at a mass ratio of 100:2.5:23.7. The amount fed was 1,500 g per end.

The temperature in the centrifugal molding machine was 40° C. The number of rotations was 350 rpm. The centrifugation time was 5 hours. After the centrifugation, the potting caps at both ends were removed upon curing of the epoxy resin, and curing was further carried out at 100° C. for 2 hours. Thereafter, the potting parts at both ends were cut with a circular saw to open the first end and the second end of the hollow fiber membranes, and the upper cap and the lower cap were attached to obtain a hollow fiber membrane module. The potting part of the hollow fiber membrane module 102 had a compressive yield stress at 125° C. of 12 MPa and a glass transition point of 80° C.

Into the hollow fiber membrane module 102, ethanol was fed and filtered to fill the pores of the hollow fiber membranes with ethanol. Subsequently, RO water was fed and filtered to replace ethanol with RO water.

For the integrated type hollow fiber membrane module 102, steam heating (125° C., 60 min) was carried out 50 times by the above-described method, and then an air leakage test was carried out by the above-described method. The decrease in pressure in 5 minutes was 100 kPa. Separation occurred between the potting part and the housing, and leakage occurred at the separated portion.

Comparative Example 2

A cartridge type hollow fiber membrane module was manufactured in the same manner as in Example 1 except that the first potting part was potted not in two layers of the inner potting part and the outer potting part but in only one layer. Specifically, the cartridge type hollow fiber membrane module was manufactured similarly to Example 1 in such a manner that the first end side of 5,400 hollow fiber membranes was inserted into the first potting caps 21B and 21C, and 1,890 g of a mixture of a bisphenol F type liquid epoxy resin (Huntsman Japan Co., Ltd., LST868-R14, filler content: 47% by mass), triethylenetetramine, and polyether amine (Huntsman Japan Co., Ltd., "JEFFAMINE" (registered trademark) T-403) at a mass ratio of 100:2.5:23.7 was fed for centrifugal potting. The outer potting part of the hollow fiber membrane cartridge had a compressive yield stress at 125° C. of 12 MPa and a glass transition point of 80° C. The arithmetic average roughness Ra of the sealing surface of the outer potting part was 0.8 μm.

For the cartridge type hollow fiber membrane module in which the potting layer is made of only one layer, steam heating (125° C., 60 min) was carried out 50 times by the above-described method, and then an air leakage test was carried out by the above-described method. The decrease in pressure in 5 minutes was 100 kPa. Since the potting layer is made of only one layer, the dimension of the O-ring sealing portion of the potting part decreased as a result of cure shrinkage of the potting material, and the squeeze of the O-ring could not be ensured sufficiently to thereby cause leakage.

Example 5

The cartridge type hollow fiber membrane module 101E was manufactured in substantially the same manner as in Example 1 except that the shapes of the first potting part, the cylindrical case 9, the upper cap 4, and the housing body 3 were as shown in FIG. 9. The first potting part and the upper cap 4 were sealed together via the gasket 18, and there was no dead-end space inside the gasket 18 below the first end of the first potting part where openings of the hollow fiber membranes were located.

For the cartridge type hollow fiber membrane module 101E, steam heating (125° C., 60 min) was carried out by the above-described method, and the temperature of the upper part of the first potting part during the steam heating was measured. The temperature of the upper part of the first potting part was 125° C., showing that 121° C. or higher, the standard condition of steam sterilization, was reached.

Example 6

The cartridge type hollow fiber membrane module 101F was manufactured in the same manner as in Example 3 except that the shape of the first potting part was as shown in FIG. 17. The first potting part and the upper cap 4 were sealed together via the gasket 18, and there was a dead-end space inside the gasket 18 below the first end of the first potting part where openings of the hollow fiber membranes were located. The depth of the dead-end space was 2 mm (the length of X in FIG. 17).

For the cartridge type hollow fiber membrane module 101F, steam heating (125° C., 60 min) was carried out by the above-described method, and the temperature of the upper part of the first potting part during the steam heating was measured. The temperature of the upper part of the first potting part was 123° C., showing that 121° C. or higher, the standard condition of steam sterilization, was reached.

Example 7

The cartridge type hollow fiber membrane module 101A was manufactured in the same manner as in Example 2. The outer potting part of the hollow fiber membrane cartridge had a tensile strength at 80° C. of 5 MPa and a glass transition point of 90° C.

For the cartridge type hollow fiber membrane module 101A, the filtration and backwashing at 80° C. were repeated as described above. The hollow fiber membrane cartridge was taken out to check the presence of cracks around the flange 11, and no cracks were observed after 10,000 cycles.

Example 8

The cartridge type hollow fiber membrane module 101A was manufactured in the same manner as in Example 1 except that the potting material of the outer potting part of the first potting part was changed. The potting material of the outer potting part used was a mixture of a bisphenol F type liquid epoxy resin (Huntsman Japan Co., Ltd., LST868-R14, filler content: 47% by mass) and triethylenetetramine at a mass ratio of 100:9.6. The outer potting part of the hollow fiber membrane cartridge had a tensile strength at 80° C. of 45 MPa and a glass transition point of 103° C.

For the cartridge type hollow fiber membrane module 101A, the filtration and backwashing at 80° C. were repeated as described above. The hollow fiber membrane cartridge was taken out to check the presence of cracks around the flange 11, and no cracks were observed after 10,000 cycles.

Example 9

The cartridge type hollow fiber membrane module 101A was manufactured in the same manner as in Example 1 except that the potting material of the outer potting part of the first potting part was changed. The potting material of the outer potting part used was a mixture of a bisphenol F type liquid epoxy resin (Huntsman Japan Co., Ltd., LST868-R14, filler content: 47% by mass) and polyether amine (Huntsman Japan Co., Ltd., "JEFFAMINE" (registered trademark) T-403) at a mass ratio of 100:32. The outer potting part of the hollow fiber membrane cartridge had a tensile strength at 80° C. of 3 MPa and a glass transition point of 62° C.

For the cartridge type hollow fiber membrane module 101A, the filtration and backwashing at 80° C. were repeated as described above. The hollow fiber membrane cartridge was taken out to check the presence of cracks around the flange 11, and cracks were observed after 7,000 cycles.

TABLE 1

|  | Potting type | Outer potting part | | | | Arithmetic average roughness of sealing surface Ra (µm) | P value in Expression (1) | Pressure reduction at Air leakage Test after Steam Heating (kPa) |
| --- | --- | --- | --- | --- | --- | --- | --- | --- |
|  |  | Base resin | Curing agent | Compressive yield stress at 125° C. (MPa) | Tg (° C.) |  |  |  |
| Example 1 | Two layers | Bisphenol A type liquid epoxy resin | Modified aliphatic amine Polyetheramine | 10 | 81 | 1.6 | 6.7 | 0 |
| Example 2 | Two layers | Bisphenol F type liquid epoxy resin | Triethylene-tetramine Polyetheramine | 30 | 90 | 0.8 | 15.6 | 0 |
| Example 3 | Two layers | Polymeric MDI | Polybutadien type polyol 2-ethyl-1,3-hexanediol | 0.3 | 55 | 1 | 6.7 | 3 |
| Example 4 | Two layers | Bisphenol A type liquid epoxy resin | Modified aliphatic amine Polyetheramine | 10 | 81 | 64 | 6.7 | 2 |

TABLE 1-continued

| | | | Outer potting part | | | Arithmetic average | | Pressure reduction |
| | Potting type | Base resin | Curing agent | Compressive yield stress at 125° C. (MPa) | Tg (° C.) | roughness of sealing surface Ra (μm) | P value in Expression (1) | at Air leakage Test after Steam Heating (kPa) |
|---|---|---|---|---|---|---|---|---|
| Comparative Example 1 | Integrated type | Bisphenol F type liquid epoxy resin | Triethylene-tetramine Polyetheramine | 12 | 80 | — | — | 100 |
| Comparative Example 2 | One layer | Bisphenol F type liquid epoxy resin | Triethylene-tetramine Polyetheramine | 12 | 80 | 0.8 | — | 100 |

TABLE 2

| | Dead-end Space Depth of the Upper Part of the First Potting Part (mm) | Temperature of the Upper Part of the First Potting Part during the Steam Heating (° C.) |
|---|---|---|
| Example 5 | 0 | 125 |
| Example 6 | 2 | 123 |

TABLE 3

| | | Outer potting part | | | | |
| | Potting type | Base resin | Curing agent | Tensile strength at 80° C. | Tg (° C.) | Endurance cycles of Flange of First Potting Part |
|---|---|---|---|---|---|---|
| Example 7 | Two layers | Bisphenol F type liquid epoxy resin | Triethylenetetramine Polyetheramine | 5 | 90 | 10,000 cycles or more |
| Example 8 | Two layers | Bisphenol F type liquid epoxy resin | Triethylenetetramine | 45 | 103 | 10,000 cycles or more |
| Example 9 | Two layers | Bisphenol F type liquid epoxy resin | Polyetheramine | 3 | 62 | 7,000 cycles |

INDUSTRIAL APPLICABILITY

The cartridge type hollow fiber membrane module of the present invention can be used in the fields such as fermentation industry, preparation of pharmaceuticals, food industry, and water treatment.

DESCRIPTION OF SYMBOLS

100: Hollow fiber membrane cartridge
101A: Cartridge type hollow fiber membrane module
101B: Cartridge type hollow fiber membrane module
101C: Cartridge type hollow fiber membrane module
101D: Cartridge type hollow fiber membrane module
101E: Cartridge type hollow fiber membrane module
101F: Cartridge type hollow fiber membrane module
102: Hollow fiber membrane module
1: Hollow fiber membrane
2: Hollow-fiber membrane bundle
3: Housing body
3A: Flange
3B: Flange
3C: Step
4: Upper cap
4A: Step
4B: Step
5: Lower cap
6: Feed inlet
7: Filtrate outlet
8: Feed outlet
9: Cylindrical case
91: Cylindrical case
92: Cylindrical case
9A: Flange
9B: Step
9C: Interior step
10: Distribution hole
11: First potting part
11A: Inner potting part
11B: Outer potting part
11C: Protective potting part
11D: Flange
11E: Step
11F: Groove
11G: Groove
12: Second potting part
13: Second potting part case
14: Through hole
15: O-ring
16: O-ring
17: Gasket
18: Gasket
19: Potting material feeder
20: Polyvinyl chloride cylindrical case
21A: First potting cap
21B: First potting cap
21C: First potting cap
22: Second potting cap
23: Pin
24: Support plate
112: First potting part
113: First potting part
114: First potting part
115: First potting part

116: First potting part
117: First potting part

The invention claimed is:

1. A cartridge type hollow fiber membrane module comprising:
   a housing;
   a hollow-fiber membrane bundle having a plurality of hollow fiber membranes;
   a first potting part that bonds the hollow fiber membranes at at least one end of the bundle of the plurality of hollow fiber membranes such that the hollow fiber membranes are open; and
   a sealing component that fixes the first potting part to the housing so as to be liquid tight but is not bonded to the housing,
   wherein the first potting part comprises an inner potting part and an outer potting part, wherein the inner potting part and the outer potting part are formed of the same or different potting material, wherein the potting material of the inner potting part and the outer potting part is an epoxy resin, a polyurethane or an epoxy resin in which a filler is added, wherein the sealing component is in contact with the outer potting part, wherein both the inner potting part and the outer potting part are formed in a sealing plane that includes the sealing component, and wherein the sealing plane includes a sealing direction in which the sealing component is squeezed when the first potting part is fixed with the sealing component.

2. A cartridge type hollow fiber membrane module comprising:
   a housing;
   a cylindrical case contained in the housing;
   a hollow-fiber membrane bundle having a plurality of hollow fiber membranes;
   a first potting part that bonds the hollow fiber membranes at at least one end of the bundle of the plurality of hollow fiber membranes such that the hollow fiber membranes are open; and
   a sealing component that fixes the first potting part to the cylindrical case so as to be liquid tight but is not bonded to the cylindrical case,
   wherein the first potting part comprises an inner potting part and an outer potting part, wherein the inner potting part and the outer potting part are formed of the same or different potting material, wherein the potting material of the inner potting part and the outer potting part is an epoxy resin, a polyurethane or an epoxy resin in which a filler is added, wherein the sealing component is in contact with the outer potting part, wherein both the inner potting part and the outer potting part are formed in a sealing plane that includes the sealing component, and wherein the sealing plane includes a sealing direction in which the sealing component is squeezed when the first potting part is fixed with the sealing component.

3. The cartridge type hollow fiber membrane module according to claim 1, wherein the first potting part has a proportion of length P (%) that satisfies Expression (1) below, wherein P (%) represents the proportion of the length of the outer potting part in the sealing direction in the length of the first potting part in the sealing direction:

$$P \leq 16 \tag{1}.$$

4. The cartridge type hollow fiber membrane module according to claim 1, wherein a sealing surface of the outer potting part has an arithmetic average roughness Ra of 1.6 µm or less.

5. The cartridge type hollow fiber membrane module according to claim 1, wherein the potting material for forming the outer potting part has a compressive yield stress at 125° C. of 10 MPa or more.

6. The cartridge type hollow fiber membrane module according to claim 1, wherein the housing comprises a cylindrical housing body, an upper cap mounted on a first vertical end of the cylindrical housing body, and an upper sealing component that fixes a filtrate-side end of the first potting part to the upper cap so as to be liquid tight, wherein in a region surrounded by the upper sealing component, a dead-end space that lies below openings of the hollow fiber membranes has a depth of 2 mm or less.

7. The cartridge type hollow fiber membrane module according to claim 1, wherein the potting material for forming the outer potting part has a tensile strength at 80° C. of 5 MPa or more.

8. The cartridge type hollow fiber membrane module according to claim 1, wherein the potting material for forming the outer potting part is an epoxy resin, and wherein a curing agent for the epoxy resin comprises an aliphatic amine.

9. The cartridge type hollow fiber membrane module according to claim 1, comprising a second potting part that bundles the hollow fiber membranes in a sealed state at a surface facing the first potting part, the second potting part being formed of the hollow fiber membranes and a potting material.

10. A method of manufacturing the cartridge type hollow fiber membrane module according to claim 1, comprising the steps of:
    (a) forming an inner potting part included in the first potting part; and
    (b) forming an outer potting part included in the first potting part, the step (a) comprising:
       (a-1) an inner potting material disposing step in which a potting material for forming the inner potting part is filled between the hollow fiber membranes; and
       (a-2) a curing step in which the potting material in (a-1) is cured, the step (b) comprising:
       (b-1) an outer potting material disposing step in which a potting material for forming the outer potting part is disposed such that after the curing step (a-2), the outer potting part comes into contact with the sealing material and both the inner potting part and the outer potting part are formed in the sealing direction of the sealing material; and
       (b-2) a curing step in which the potting material in (b-1) is cured and shrunk.

11. The cartridge type hollow fiber membrane module according to claim 2, wherein the first potting part has a proportion of length P (%) that satisfies Expression (1) below, wherein P (%) represents the proportion of the length of the outer potting part in the sealing direction in the length of the first potting part in the sealing direction:

$$P \leq 16 \tag{1}.$$

12. The cartridge type hollow fiber membrane module according to claim 2, wherein a sealing surface of the outer potting part has an arithmetic average roughness Ra of 1.6 µm or less.

13. The cartridge type hollow fiber membrane module according to claim 2, wherein the potting material for forming the outer potting part has a compressive yield stress at 125° C. of 10 MPa or more.

14. The cartridge type hollow fiber membrane module according to claim 2, wherein the housing comprises a cylindrical housing body, an upper cap mounted on a first vertical end of the housing body, and an upper sealing component that fixes a filtrate-side end of the first potting part to the upper cap so as to be liquid tight, wherein in a region surrounded by the upper sealing component, a dead-end space that lies below openings of the hollow fiber membranes has a depth of 2 mm or less.

15. The cartridge type hollow fiber membrane module according to claim 2, wherein the potting material for forming the outer potting part has a tensile strength at 80° C. of 5 MPa or more.

16. The cartridge type hollow fiber membrane module according to claim 2, wherein the potting material for forming the outer potting part is an epoxy resin, and wherein a curing agent for the epoxy resin comprises an aliphatic amine.

17. The cartridge type hollow fiber membrane module according to claim 2, comprising a second potting part that bundles the hollow fiber membranes in a sealed state at a surface facing the first potting part, the second potting part being formed of the hollow fiber membranes and a potting material.

* * * * *